US012605935B2

(12) United States Patent
Nakamura et al.

(10) Patent No.: US 12,605,935 B2
(45) Date of Patent: Apr. 21, 2026

(54) LIQUID DISCHARGE APPARATUS

(71) Applicant: SEIKO EPSON CORPORATION, Tokyo (JP)

(72) Inventors: Hiroyuki Nakamura, Shiojiri (JP); Akira Yamagishi, Shiojiri (JP); Akihiro Toya, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 171 days.

(21) Appl. No.: 18/394,010

(22) Filed: Dec. 22, 2023

(65) Prior Publication Data

US 2024/0208223 A1 Jun. 27, 2024

(30) Foreign Application Priority Data

Dec. 26, 2022 (JP) ................................ 2022-207766

(51) Int. Cl.
*B41J 2/165* (2006.01)
*B41J 2/17* (2006.01)

(52) U.S. Cl.
CPC ....... *B41J 2/16505* (2013.01); *B41J 2/16508* (2013.01); *B41J 2/16579* (2013.01); *B41J 2/1721* (2013.01)

(58) Field of Classification Search
CPC .. B41J 2/16505; B41J 2/16508; B41J 2/1721; B41J 2/16523
See application file for complete search history.

(56) References Cited

U.S. PATENT DOCUMENTS 9,278,533 B2 * 3/2016 Shimazu ................ B41J 2/1721
10,967,637 B2 * 4/2021 Nakashima .......... B41J 2/16523
2022/0258470 A1 8/2022 Toya

FOREIGN PATENT DOCUMENTS

JP 2022-131882 A 9/2022
JP 2023152170 A * 10/2023 .......... B41J 2/16523

* cited by examiner

*Primary Examiner* — Sharon Polk
(74) *Attorney, Agent, or Firm* — WORKMAN NYDEGGER

(57) ABSTRACT

A liquid discharge apparatus includes a liquid discharge portion configured to discharge liquid, a maintenance portion that performs maintenance of the liquid discharge portion, a reception portion arranged on a lower side than the maintenance portion in a vertical direction and configured to receive waste liquid dripping from the maintenance portion, and a waste liquid flow path through which the waste liquid flows. The liquid discharge portion includes a nozzle configured to discharge the liquid in a discharge direction intersecting with the vertical direction. The reception portion includes a communication path that guides the received waste liquid to the waste liquid flow path. The communication path is provided at a lower portion of the reception portion.

11 Claims, 14 Drawing Sheets

LIQUID DISCHARGE APPARATUS

The present application is based on, and claims priority from JP Application Serial Number 2022-207766, filed Dec. 26, 2022, the disclosure of which is hereby incorporated by reference herein in its entirety.

BACKGROUND

1. Technical Field

The present disclosure relates to a liquid discharge apparatus that can discharge liquid.

2. Related Art

For example, JP-A-2022-131882 discloses a liquid discharge apparatus that performs recording on a medium by discharging liquid from a liquid discharge portion. Further, the liquid discharge apparatus includes a maintenance portion that performs maintenance of the liquid discharge portion. Examples of the maintenance portion include a cap portion that can cover a nozzle surface of the liquid discharge portion and a wiping portion that can wipe the nozzle surface of the liquid discharge portion.

However, in such a liquid discharge apparatus, there is a concern that, due to waste liquid dripping from the maintenance portion flowing out into the liquid discharge apparatus, the waste liquid flowing out into the liquid discharge apparatus leaks to an outside of the liquid discharge apparatus.

SUMMARY

The present disclosure is a liquid discharge apparatus including a liquid discharge portion configured to discharge liquid, a maintenance portion that performs maintenance of the liquid discharge portion, a reception portion arranged on a lower side than the maintenance portion in a vertical direction and configured to receive waste liquid dripping from the maintenance portion, and a waste liquid flow path through which the waste liquid flows, in which the liquid discharge portion includes a nozzle configured to discharge the liquid in a discharge direction intersecting with the vertical direction, the reception portion includes a communication path that guides the received waste liquid to the waste liquid flow path, and the communication path is provided at a lower portion of the reception portion.

DESCRIPTION OF EMBODIMENTS

First Embodiment

A first embodiment of a liquid discharge apparatus will be described below with reference to the accompanying drawings. In the following description, assuming that the liquid discharge apparatus of the present embodiment is placed on a horizontal surface, a direction intersecting with (for example, orthogonal to) a vertical direction Z is a width direction X. One of the width directions X is set as a first width direction X1, and the other of the width directions X is set as a second width direction X2. An upper side in the vertical direction Z is defined as an upper side Z1, and a lower side in the vertical direction Z is defined as a lower side Z2.

Configuration of Liquid Discharge Apparatus 11

Figure 1:
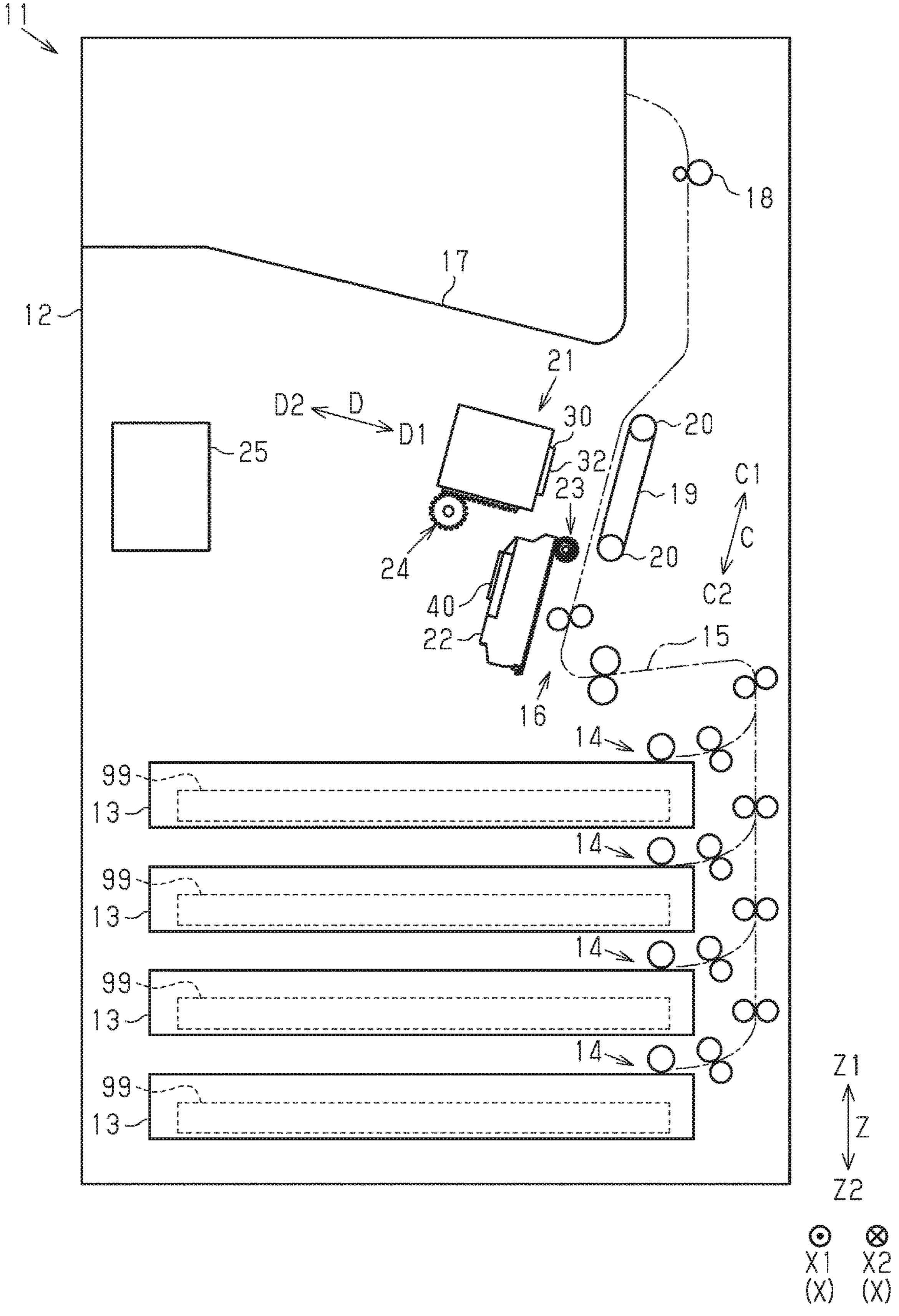
FIG. 1 is a schematic view of a liquid discharge apparatus.

As illustrated in FIG. 1, a liquid discharge apparatus 11 is an apparatus that can discharge liquid. The liquid discharge apparatus 11 may be an ink jet printer that performs recording by discharging ink, which is an example of the liquid, onto a medium. The medium may be, for example, paper, cloth, vinyl, a plastic component, a metal component, and the like.

The liquid discharge apparatus 11 may include a housing 12, a medium accommodation portion 13, a feed portion 14, a transport path 15, a transport portion 16, and a stacker 17. The liquid discharge apparatus 11 may include a plurality of medium accommodation portions 13 and the same number of feed portions 14 as the medium accommodation portions 13.

The housing 12 is configured to accommodate various members that configure the liquid discharge apparatus 11. The medium accommodation portion 13 may be configured to accommodate a plurality of media 99 in a stacked state. The feed portion 14 feeds out the medium 99 accommodated in the medium accommodation portion 13 one by one from the corresponding medium accommodation portion 13 to the transport path 15.

The transport path 15 is a path through which the medium 99 is transported by the transport portion 16. The transport path 15 couples the medium accommodation portion 13 and the stacker 17. In FIG. 1, the transport path 15 is illustrated by a one-dot chain line. The stacker 17 receives the transported medium 99.

The transport portion 16 transports the medium 99 fed out by the feed portion 14 along the transport path 15. The transport portion 16 discharges the transported medium 99 to the stacker 17. The transport portion 16 may include a plurality of transport rollers 18. Each of the plurality of transport rollers 18 transports the medium 99 by rotating in a state in which the medium 99 is interposed therebetween.

The transport portion 16 may include an endless transport belt 19 and a pair of pulleys 20. The transport belt 19 is hung over the pair of pulleys 20. The transport belt 19 transports the medium 99 along a transport direction C1 by rotating in a state in which the medium 99 is adsorbed thereon. The transport belt 19 functions as an example of a support portion that supports the medium 99.

The liquid discharge apparatus 11 includes a liquid discharge portion 21. The liquid discharge portion 21 can discharge the liquid. The liquid discharge portion 21 is provided at a position along the transport path 15. The liquid discharge portion 21 is configured to perform recording on the medium 99 by discharging the liquid onto the medium 99 supported by the transport belt 19. The liquid discharge portion 21 may be configured to discharge the liquid in a discharge direction D1. The discharge direction D1 is a direction perpendicular to the transport direction C1 of the medium 99. The discharge direction D1 may have an angle of 15 degrees with a horizontal direction.

The liquid discharge portion 21 is a line head, but may be a serial head. The line head is a head that can simultaneously discharge the liquid across a width of the medium 99. The serial head is a head that scans the medium 99 in the width direction X.

The liquid discharge apparatus 11 includes a maintenance portion 22. The maintenance portion 22 performs maintenance of the liquid discharge portion 21. As will be described below in detail, the maintenance portion 22 can perform the maintenance of the liquid discharge portion 21 in a state of being into contact with a nozzle surface 32 of the liquid discharge portion 21.

The liquid discharge apparatus 11 includes a maintenance movement portion 23. The maintenance movement portion 23 can move the maintenance portion 22 along a second movement direction C. The second movement direction C is a direction along the transport direction C1. The second movement direction C includes the transport direction C1 and a direction C2 opposite to the transport direction C1. The second movement direction C is a direction intersecting with the horizontal direction and the vertical direction Z.

The liquid discharge apparatus 11 includes a movement portion 24. The movement portion 24 is configured to move the liquid discharge portion 21 along a first movement direction D. The first movement direction D is a direction along the discharge direction D1. The first movement direction D includes the discharge direction D1 and a direction D2 opposite to the discharge direction D1. The first movement direction D is a direction intersecting with the horizontal direction and the vertical direction Z.

The liquid discharge apparatus 11 may include a control portion 25. The control portion 25 comprehensively controls driving of each mechanism in the liquid discharge apparatus 11 and controls various operations executed in the liquid discharge apparatus 11. In particular, the control portion 25 may control the feed portion 14, the transport portion 16, the liquid discharge portion 21, the maintenance movement portion 23, and the movement portion 24.

The control portion 25 can be configured as a circuit including α: one or more processors that execute various types of processing according to a computer program, β: one or more dedicated hardware circuits that execute at least a part of various types of processing, or γ: a combination thereof. The hardware circuit is, for example, an application specific integrated circuit. The processor includes a CPU and a memory, such as a RAM and a ROM, and the memory stores a program code or a command configured to cause the CPU to execute processing. The memory, that is, a computer readable medium includes any readable medium accessible by a general-purpose or dedicated computer.

Configurations of Liquid Discharge Portion 21 and Maintenance Portion 22

Here, configurations of the liquid discharge portion 21 and the maintenance portion 22 will be described with reference to FIGS. 2 to 5.

Figure 2:
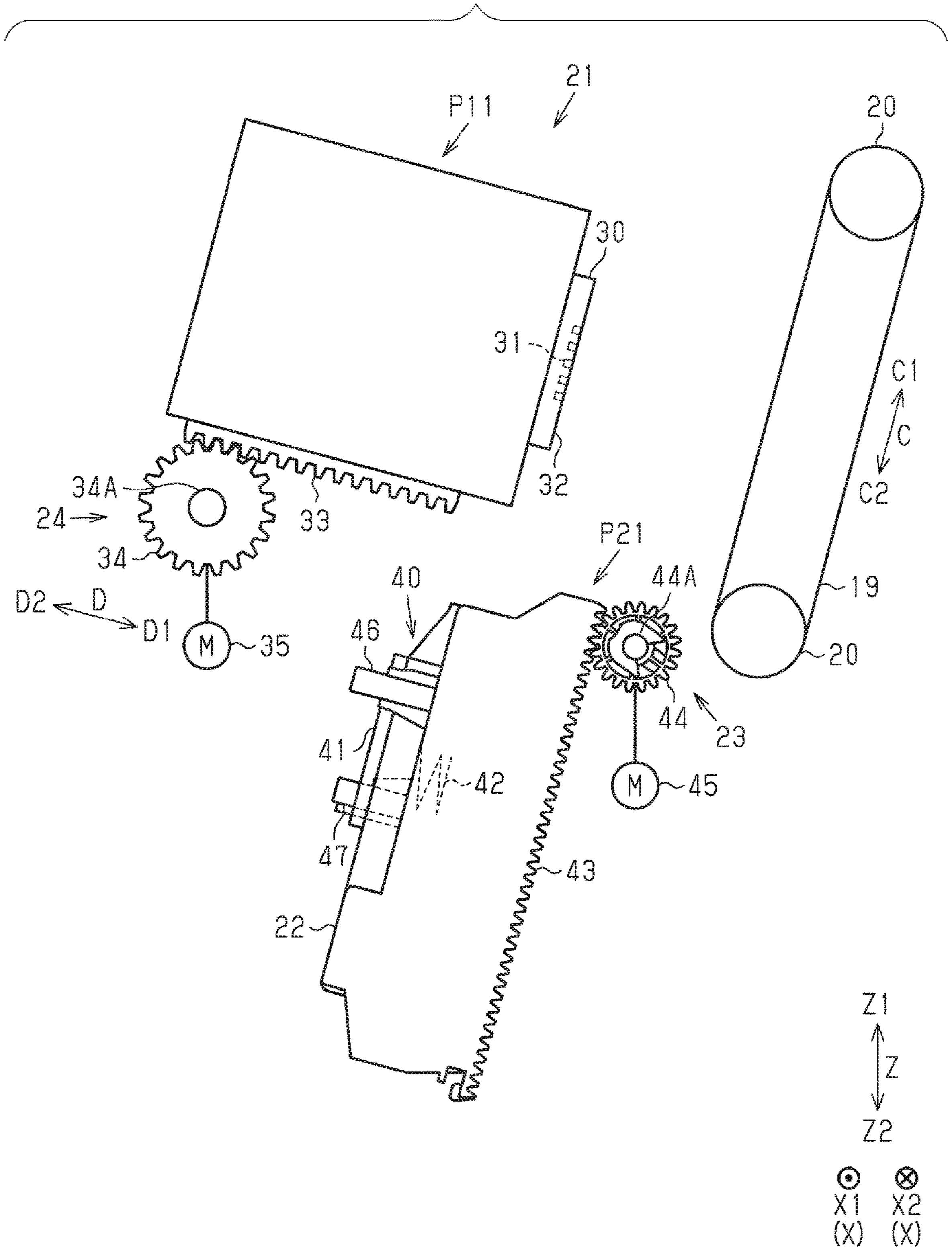
FIG. 2 is a schematic view illustrating a liquid discharge portion and a maintenance portion.
Figure 3:
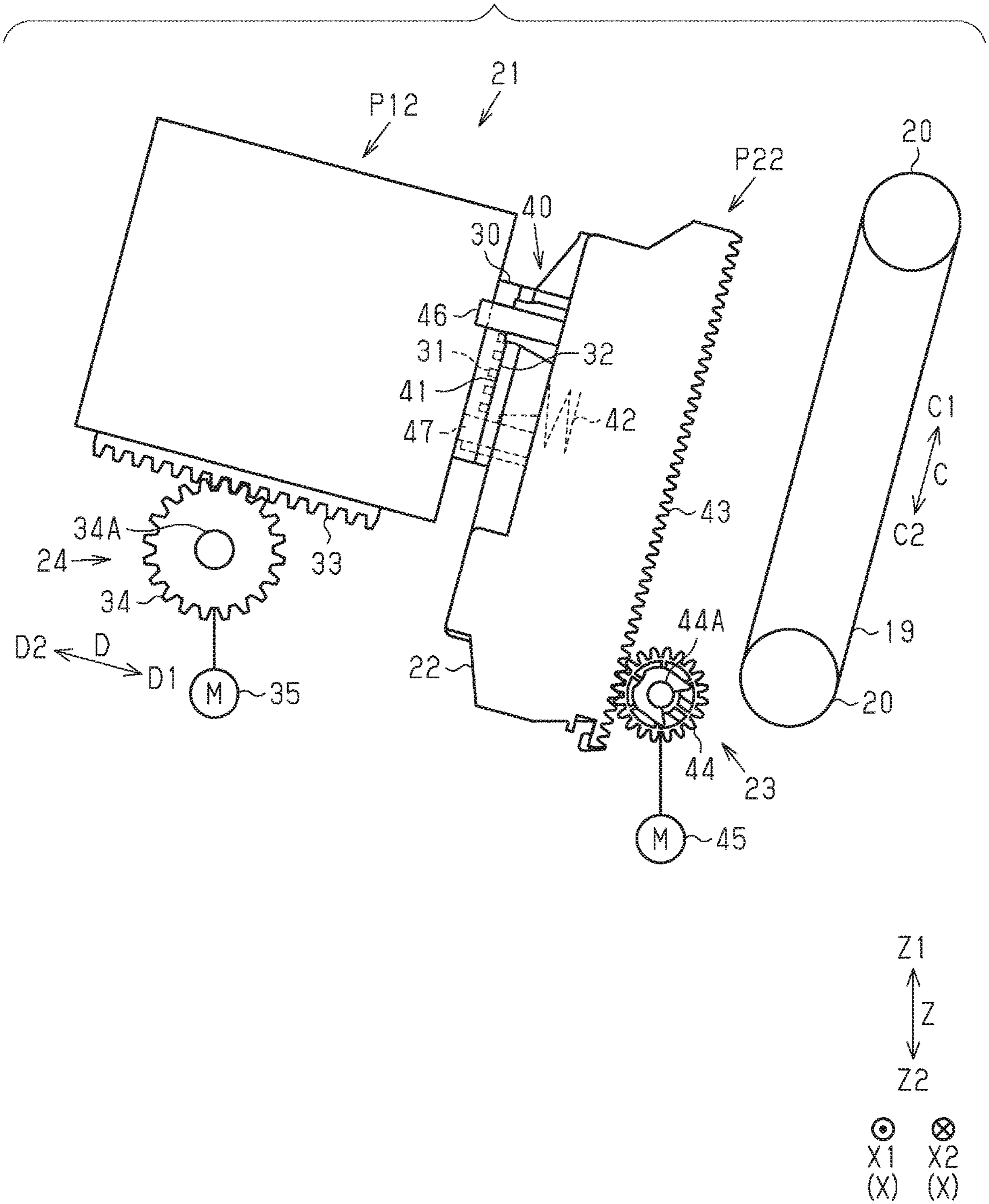
FIG. 3 is a schematic view illustrating the liquid discharge portion and the maintenance portion.
Figure 4:
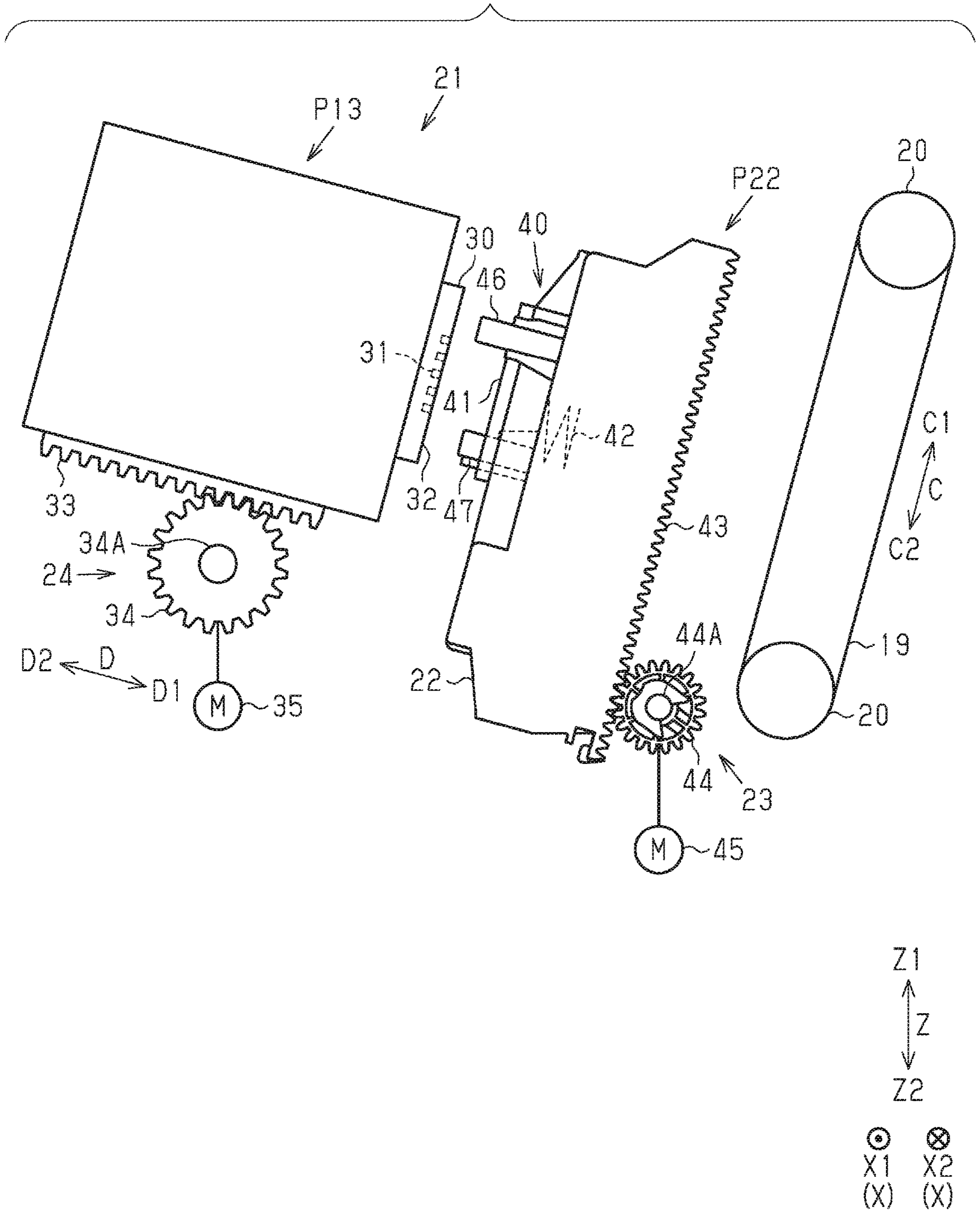
FIG. 4 is a schematic view illustrating the liquid discharge portion and the maintenance portion.

As illustrated in FIGS. 2 to 4, the liquid discharge portion 21 includes a nozzle portion 30. The nozzle portion 30 is configured to discharge the liquid. The nozzle portion 30 includes a nozzle 31 and the nozzle surface 32. The nozzle portion 30 may include a plurality of nozzles 31. The nozzle 31 is configured to discharge the liquid. The nozzle 31 is open on nozzle surface 32. In other words, the nozzle surface 32 is configured such that the nozzle 31 is open. The nozzle surface 32 is a surface orthogonal to the discharge direction D1. As described above, the liquid discharge portion 21 can discharge the liquid in the discharge direction D1 perpendicular to the nozzle surface 32.

The liquid discharge portion 21 includes a first rack 33. The first rack 33 is provided on a side of the direction C2 opposite to the transport direction C1 of the liquid discharge portion 21. The first rack 33 is provided to extend along the first movement direction D.

The movement portion 24 may be located on a lower side Z2 of the liquid discharge portion 21. The movement portion 24 includes a first wheel 34. The first wheel 34 is mounted to rotate about a first rotation shaft 34A. The first rotation shaft 34A is provided to extend along the width direction X. The first wheel 34 can be fitted with the first rack 33.

The movement portion 24 includes a first driving source 35. The first driving source 35 is a driving source of the first wheel 34. The first driving source 35 may be a motor. The movement portion 24 rotates the first wheel 34 about the first rotation shaft 34A by power from the first driving source 35. The movement portion 24 moves the liquid discharge portion 21 along the first movement direction D by the rotated first wheel 34 being fitted with the first rack 33.

In this way, the movement portion 24 acts on the liquid discharge portion 21 in the direction C2 opposite to the transport direction C1. In other words, an action point at which the movement portion 24 acts on the liquid discharge portion 21 is on the side of the direction C2 opposite to the transport direction C1 of the liquid discharge portion 21.

The liquid discharge portion 21 can move to a discharge position P11 illustrated in FIG. 2, a maintenance position P12 illustrated in FIG. 3, and a retracted position P13 illustrated in FIG. 4 along the first movement direction D by the driving of the movement portion 24. In other words, the movement portion 24 can move the liquid discharge portion 21 to the discharge position P11, the maintenance position P12, and the retracted position P13.

As illustrated in FIG. 2, the discharge position P11 is a position when the liquid discharge portion 21 discharges the liquid to the medium 99. Out of the discharge position P11, the maintenance position P12, and the retracted position P13, the discharge position P11 is a position at which the liquid discharge portion 21 comes closest to the transport belt 19.

As illustrated in FIG. 3, the maintenance position P12 is a position when the maintenance is performed on the liquid discharge portion 21. The maintenance position P12 is, for example, a position farther from the transport belt 19 than the discharge position P11. The maintenance position P12 is, for example, a position closer to the transport belt 19 than the retracted position P13.

As illustrated in FIG. 4, the retracted position P13 is a position when the liquid discharge portion 21 is retracted. Out of the discharge position P11, the maintenance position P12, and the retracted position P13, the retracted position P13 is a position farthest from the transport belt 19.

As illustrated in FIGS. 2 to 4, the maintenance portion 22 includes a cap portion 40. The cap portion 40 is located on the side of the direction D2 opposite to the discharge direction D1 of the maintenance portion 22. The cap portion 40 can cover the nozzle surface 32. The cap portion 40 performs the maintenance of the liquid discharge portion 21.

Figure 5:
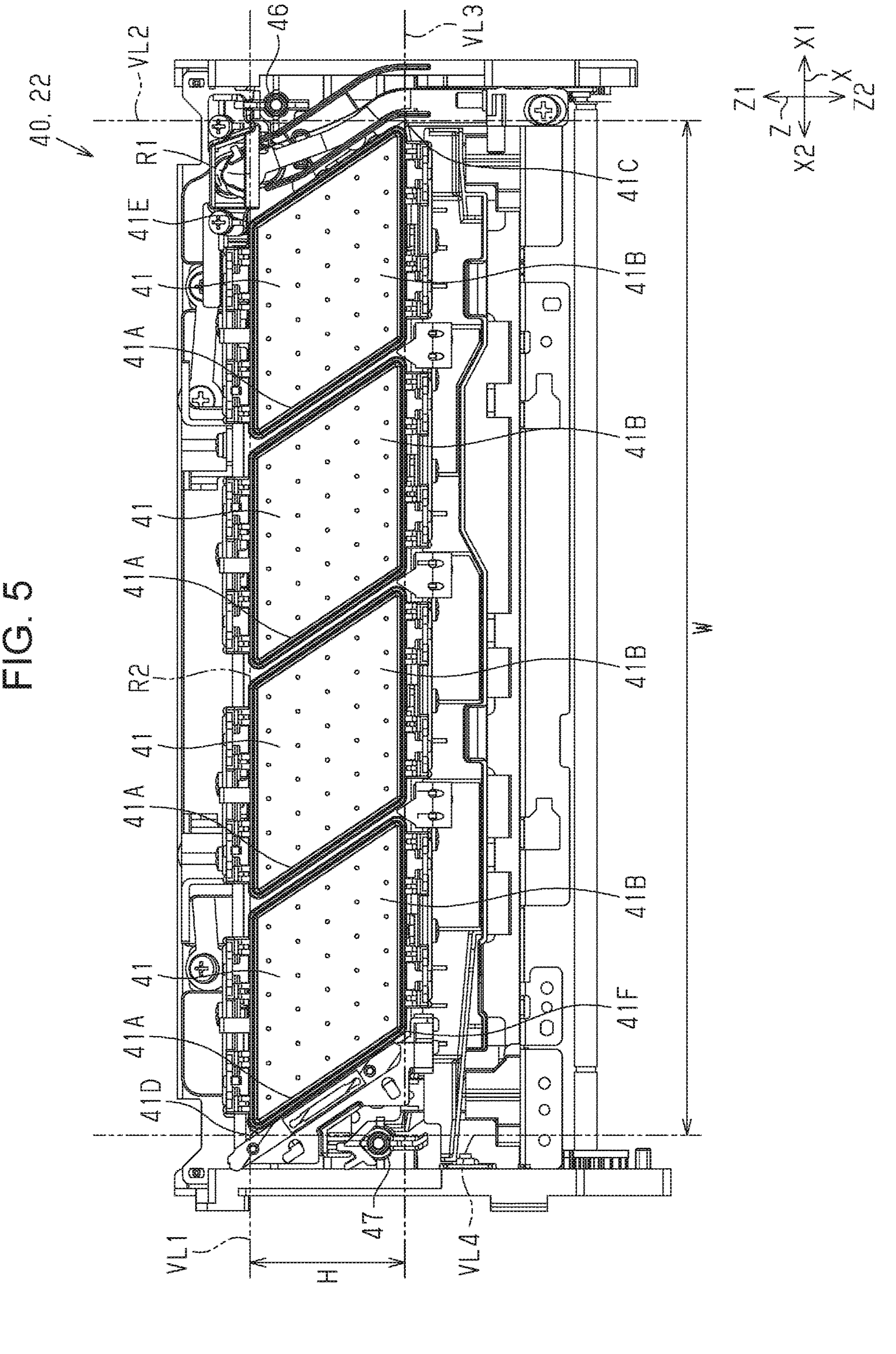
FIG. 5 is a front view illustrating a cap portion.

As illustrated in FIG. 5, the cap portion 40 includes a cap member 41. The cap portion 40 may include one or a plurality of cap members 41. The cap portion 40 includes four cap members 41, but may include one, three, and five or more cap members 41.

The cap member 41 can cover the nozzle surface 32. The cap member 41 performs capping of the liquid discharge portion 21 by coming into contact with the liquid discharge portion 21. The capping is the maintenance for reducing dry of the liquid in the nozzle 31 by forming a space that covers the nozzle 31.

The cap portion 40 may perform the maintenance of the liquid discharge portion 21 by receiving the liquid discharged by the liquid discharge portion 21 by flushing. The flushing is an operation in which the liquid discharge portion 21 appropriately discharges the liquid. The flushing is the maintenance for suppressing clogging of the nozzle 31. In addition to the capping and the flushing, the maintenance portion 22 may perform the maintenance of the liquid discharge portion 21, such as pressurization cleaning.

The cap member 41 includes a wall portion 41A and an opening portion 41B. The wall portion 41A is provided at an outer edge portion of the cap member 41. The wall portion 41A is provided to surround an outer edge of the opening portion 41B. The wall portion 41A protrudes in the direction D2 opposite to the discharge direction D1. The opening portion 41B is open in the direction D2 opposite to the discharge direction D1. The cap member 41 can form the space in which the nozzle 31 is open by the opening portion 41B coming into contact with the liquid discharge portion 21.

The cap member 41 is arranged in a second region R2 of a first region R1. The first region R1 has a rectangular shape having a width W and a height H when viewed from the direction D2 opposite to the discharge direction D1. The second region R2 has a parallelogram shape when viewed from the direction D2 opposite to the discharge direction D1. In other words, the cap member 41 is provided in the parallelogram shape when viewed in the first movement direction D. The width W may be longer than the height H. In other words, the width direction X of the cap member 41 may be longitudinal.

The cap member 41 has a first acute angle portion 41C and a second acute angle portion 41D. The first acute angle portion 41C is one acute angle of the parallelogram shape when viewed from the first movement direction D along the discharge direction D1. Specifically, the first acute angle portion 41C is an acute angle of the parallelogram shape on a side of the first width direction X1. On the other hand, the second acute angle portion 41D is the other acute angle of the parallelogram shape when viewed from the first movement direction D along the discharge direction D1. Specifically, the second acute angle portion 41D is an acute angle of the parallelogram shape on a side of the second width direction X2.

The cap member 41 includes a first obtuse angle portion 41E and a second obtuse angle portion 41F. The first obtuse angle portion 41E is one obtuse angle of the parallelogram shape when viewed from the first movement direction D along the discharge direction D1. Specifically, the first obtuse angle portion 41E is an obtuse angle of the parallelogram shape on the side of the first width direction X1. On the other hand, the second obtuse angle portion 41F is the other obtuse angle of the parallelogram shape when viewed from the first movement direction D along the discharge direction D1. Specifically, the second obtuse angle portion 41F is an obtuse angle of the parallelogram shape on the side of the second width direction X2.

As illustrated in FIGS. 2 to 4, the cap portion 40 includes a biasing portion 42. The biasing portion 42 biases the cap member 41 toward the nozzle portion 30. The biasing means pushing back a target when a force is applied to the target. The biasing portion 42 may be, for example, a spring. When the liquid discharge portion 21 moves from the retracted position P13 to the maintenance position P12 along the first movement direction D, the biasing portion 42 biases the cap member 41 toward the nozzle portion 30 against the movement direction of the liquid discharge portion 21 in a state in which the cap member 41 covers the nozzle surface 32. As a result, the nozzle portion 30 is pushed into the cap member 41 against the biasing by the biasing portion 42.

The maintenance portion 22 includes a second rack 43. The second rack 43 is provided on a side of the discharge direction D1 of the maintenance portion 22. The second rack 43 is provided to extend along the second movement direction C.

The maintenance movement portion 23 includes a second wheel 44. The second wheel 44 is mounted to rotate about a second rotation shaft 44A. The second rotation shaft 44A is provided to extend along the width direction X. The second wheel 44 can be fitted with the second rack 43.

The maintenance movement portion 23 includes a second driving source 45. The second driving source 45 is a driving source of the second wheel 44. The second driving source 45 may be a motor. The maintenance movement portion 23 rotates the second wheel 44 about the second rotation shaft 44A by power from the second driving source 45. The maintenance movement portion 23 moves the maintenance portion 22 along the second movement direction C by the rotated second wheel 44 being fitted with the second rack 43.

The maintenance portion 22 can move to a standby position P21 illustrated in FIG. 2 and an execution position P22 illustrated in FIGS. 3 and 4 along the second movement direction C by the driving of the maintenance movement portion 23. In other words, the maintenance movement portion 23 can move the maintenance portion 22 to the standby position P21 and the execution position P22.

As illustrated in FIG. 2, the standby position P21 is a position when the liquid discharge portion 21 discharges the liquid to the medium 99. The standby position P21 is a position at which the cap member 41 does not face the nozzle surface 32. The standby position P21 is a position deviated from a movement region of the liquid discharge portion 21. In other words, the standby position P21 is a position at which the liquid discharge portion 21 can move to the discharge position P11.

As illustrated in FIGS. 3 and 4, the execution position P22 is a position when the maintenance is performed on the liquid discharge portion 21. The execution position P22 is a position at which the cap member 41 faces the nozzle surface 32. The execution position P22 is a position between the liquid discharge portion 21 and the transport belt 19 at the retracted position P13. The execution position P22 is a position at which the cap member 41 can cover the nozzle surface 32.

When the liquid discharge portion 21 is located at the retracted position P13, the control portion 25 controls the maintenance movement portion 23 to move the maintenance portion 22 between the standby position P21 and the execution position P22. When the liquid discharge portion 21 is not located at the retracted position P13, the control portion 25 does not move the maintenance portion 22 from the standby position P21 to the execution position P22.

When the control portion 25 moves the liquid discharge portion 21 between the discharge position P11 and the maintenance position P12, the control portion 25 may control the movement portion 24 to temporarily retract the liquid discharge portion 21 to the retracted position P13. In particular, when the maintenance portion 22 is located at the standby position P21, the control portion 25 controls the movement portion 24 to move the liquid discharge portion 21 from the retracted position P13 to the discharge position P11. When the maintenance portion 22 is located at the execution position P22, the control portion 25 does not move the liquid discharge portion 21 from the retracted position P13 to the discharge position P11. When the maintenance portion 22 is located at the execution position P22, the movement portion 24 controls the movement portion 24 to move the liquid discharge portion 21 from the retracted position P13 to the maintenance position P12.

As described above, when the maintenance portion 22 is located at the execution position P22, the movement portion 24 can move the liquid discharge portion 21 toward the maintenance portion 22 along the first movement direction D.

As illustrated in FIG. 5, the cap portion 40 includes a first positioning portion 46 and a second positioning portion 47 as positioning portions, but may include one or three or more positioning portions. In this way, the maintenance portion 22 includes the first positioning portion 46 and the second positioning portion 47.

The first positioning portion 46 and the second positioning portion 47 performs positioning of the cap portion 40 and the liquid discharge portion 21 by coming into contact with the liquid discharge portion 21. Specifically, the first positioning portion 46 and the second positioning portion 47 regulate relative movement between the cap portion 40 and the liquid discharge portion 21 in the second movement direction C when the cap portion 40 and the liquid discharge portion 21 come into contact with each other as the liquid discharge portion 21 moves to the cap portion 40. The first positioning portion 46 and the second positioning portion 47 may regulate relative movement between the cap portion 40 and the liquid discharge portion 21 in the first movement direction D when the cap portion 40 and the liquid discharge portion 21 come into contact with each other as the liquid discharge portion 21 moves to the cap portion 40.

The first positioning portion 46 is located on a side of the transport direction C1 with, as a reference, the center of the second region R2 in the second movement direction C. The first positioning portion 46 is provided at a position that straddles a first virtual line VL1. The first virtual line VL1 is a virtual line along the width direction X, and is a virtual line passing through the first obtuse angle portion 41E along an upper side of the second region R2. In other words, a part of the first positioning portion 46 is provided in a region overlapping the first obtuse angle portion 41E in the width direction X.

The first positioning portion 46 is located on the side of the first width direction X1 of the second region R2 in the width direction X. The first positioning portion 46 is provided at a position that straddles a second virtual line VL2. The second virtual line VL2 is a virtual line along the second movement direction C, and is a virtual line passing through the first acute angle portion 41C. In other words, a part of the first positioning portion 46 is provided in a region overlapping the first acute angle portion 41C in the second movement direction C.

On the other hand, the second positioning portion 47 is located on a side of the direction C2 opposite to the transport direction C1 with, as a reference, the center of the second region R2 in the second movement direction C. The second positioning portion 47 is provided at a position that straddles a third virtual line VL3. The third virtual line VL3 is a virtual line along the width direction X, and is a virtual line passing through the second obtuse angle portion 41F along a lower side of the second region R2. In other words, a part of the second positioning portion 47 is provided in a region overlapping the second obtuse angle portion 41F in the width direction X.

The second positioning portion 47 is located on a side of the second width direction X2 of the second region R2 in the width direction X. The second positioning portion 47 is provided at a position that straddles a fourth virtual line VL4. The fourth virtual line VL4 is a virtual line along the second movement direction C, and is a virtual line passing through the second acute angle portion 41D. In other words, a part of the second positioning portion 47 is provided in a region overlapping the second acute angle portion 41D in the second movement direction C.

As described above, the first positioning portion 46 and the second positioning portion 47 are provided at positions with the cap member 41 interposed therebetween in the second movement direction C. The first positioning portion 46 is provided on a side of the transport direction C1 with respect to the second positioning portion 47. It should be noted that the first rack 33 is provided on the side of the direction C2 opposite to the transport direction C1 of the liquid discharge portion 21. Therefore, it can be said that the first positioning portion 46 is provided at a position farther than the second positioning portion 47 in the second movement direction C with, as a reference, the action point at which the movement portion 24 acts on the liquid discharge portion 21. The first positioning portion 46 is provided on the upper side Z1 of the second positioning portion 47 in the vertical direction Z.

Configuration of Reception Portion 50

Figure 6:
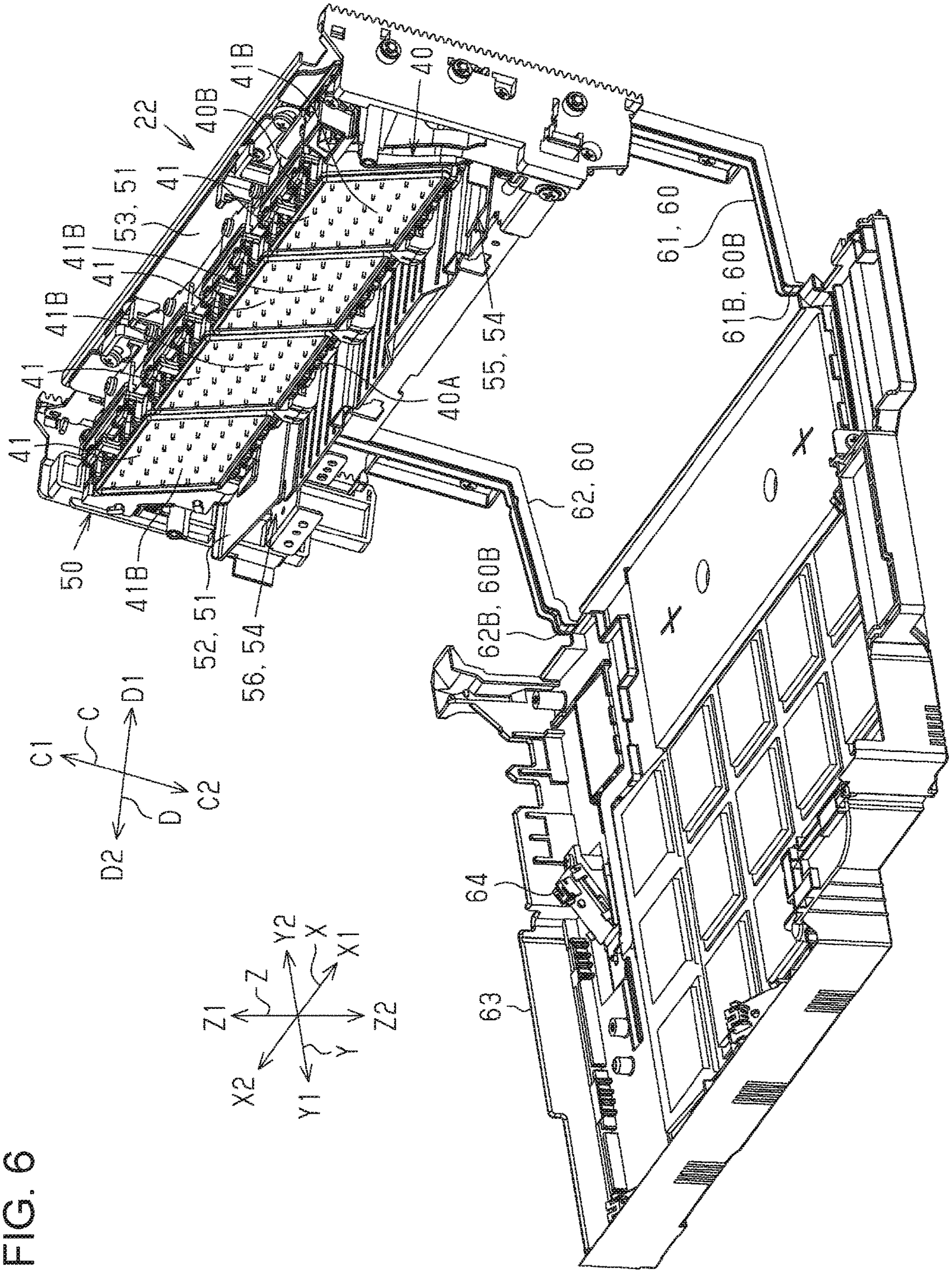
FIG. 6 is a perspective view illustrating the cap portion, a reception portion a waste liquid flow path, and an accommodation portion.
Figure 7:
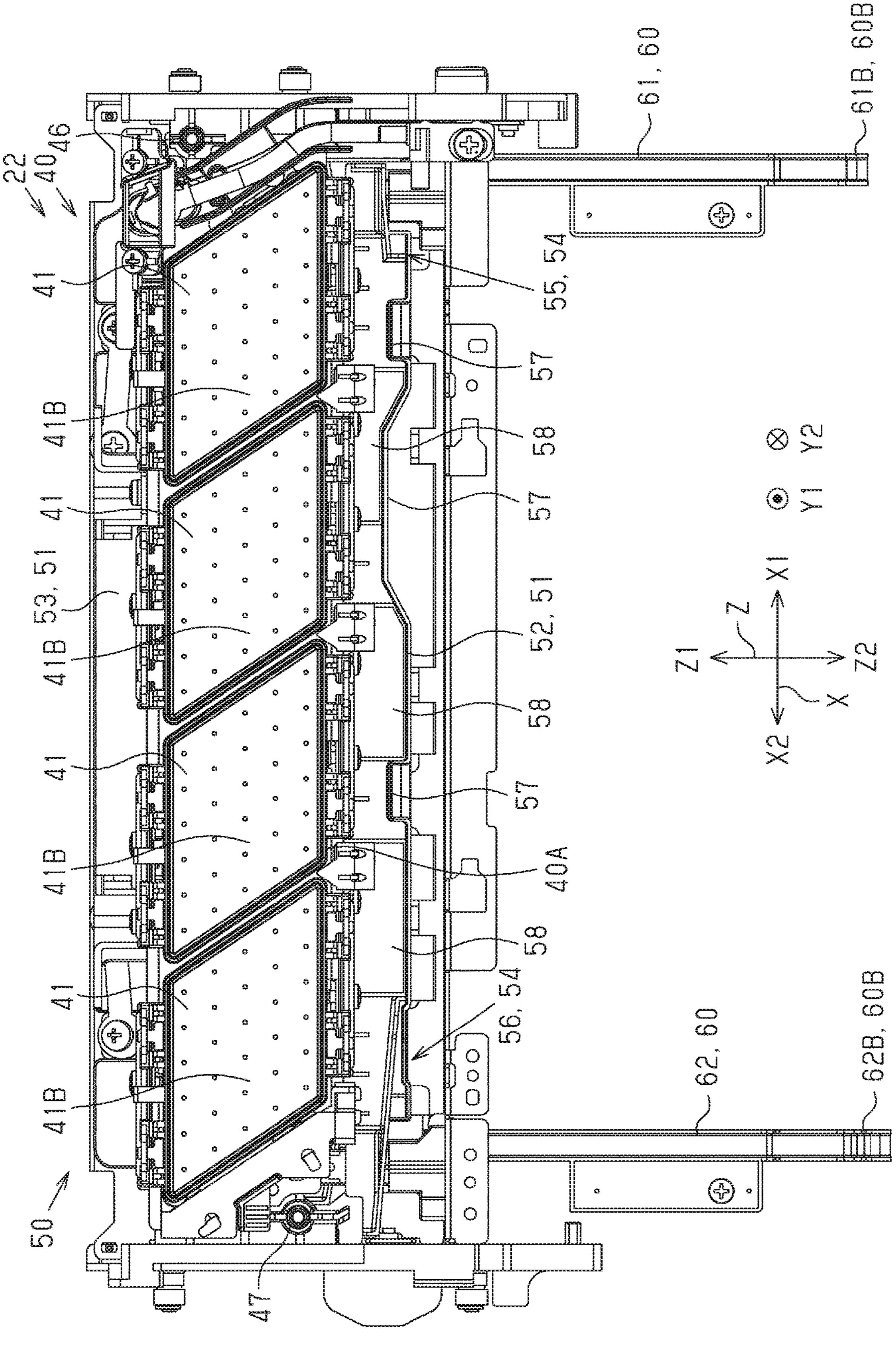
FIG. 7 is a front view illustrating the cap portion, the reception portion, and the waste liquid flow path.

As illustrated in FIGS. 6 and 7, the liquid discharge apparatus 11 includes a reception portion 50. The reception portion 50 can receive waste liquid dripping from the maintenance portion 22. In particular, the reception portion 50 can receive the waste liquid dripping from the cap portion 40. It should be noted that, in the drawings, a direction intersecting with (for example, orthogonal to) the vertical direction Z and the width direction X is a depth direction Y. One of the depth directions Y is defined as a first depth direction Y1, and the other of the depth directions Y is defined as a second depth direction Y2. The reception portion 50 may be assembled on the maintenance portion 22. The reception portion 50 may operate in conjunction with the maintenance portion 22.

The reception portion 50 may be formed in an L shape when viewed from the side of the second width direction X2. The reception portion 50 is arranged on the lower side Z2 of the maintenance portion 22 and in the second depth direction Y2 of the maintenance portion 22.

The reception portion 50 includes a reception surface 51. The reception surface 51 is a surface that can receive the waste liquid. Specifically, the reception portion 50 may include a first reception surface 52 and a second reception surface 53 as the reception surface 51. The first reception surface 52 is a surface facing a side surface 40A of the cap portion 40. The side surface 40A of the cap portion 40 is a side surface facing the lower side Z2 of the cap portion 40 with a direction in which the opening portion 41B of the cap member 41 is open as the front surface. The first reception surface 52 is configured to be inclined to the lower side Z2 toward the center at both end portions in the width direction X. The second reception surface 53 is a surface facing a bottom surface 40B of the cap portion 40. The bottom surface 40B of the cap portion 40 is a surface facing in a direction opposite to the direction in which the opening portion 41B of the cap member 41 is open.

The reception portion 50 includes a communication path 54. The communication path 54 is provided at a lower portion of the reception portion 50. The communication path 54 is configured to guide the received waste liquid to a waste liquid flow path 60 described below. Specifically, the reception portion 50 includes a first communication path 55 and a second communication path 56 as the communication path 54.

The first communication path 55 is provided at the lower portion of the reception portion 50. The first communication path 55 is provided on the side of the first width direction X1 with respect to the center of the cap portion 40. In other words, the first communication path 55 is provided on one side with respect to the center of the cap portion 40 in the width direction X intersecting with the discharge direction D1. The first communication path 55 guides the received waste liquid to a first waste liquid flow path 61 described below.

The second communication path 56 is provided at the lower portion of the reception portion 50. The second communication path 56 is provided on the side of the second width direction X2 with respect to the center of the cap portion 40. In other words, the second communication path 56 is provided on the other side with respect to the center of the cap portion 40 in the width direction X intersecting with the discharge direction D1. The second communication path 56 guides the received waste liquid to a second waste liquid flow path 62 described below.

The reception portion 50 may include a protrusion portion 57. The reception portion 50 includes three protrusion portions 57, but may include one, two, or four or more protrusion portions 57. In other words, the reception portion 50 may include at least one protrusion portion 57. The protrusion portion 57 is provided on the first reception surface 52. The protrusion portion 57 is configured to protrude to the upper side Z1 on the first reception surface 52. The protrusion portion 57 is provided between the first communication path 55 and the second communication path 56 in the width direction X.

The reception portion 50 may include an absorbing material 58. The reception portion 50 includes three absorbing materials 58, but may include one, two, or four or more absorbing materials 58. In other words, the reception portion 50 may include at least one absorbing material 58. The absorbing material 58 is provided between the first communication path 55 and the second communication path 56 in the width direction X of the second reception surface 53. The absorbing material 58 is configured to absorb the liquid. Specifically, a part or entirety of the absorbing material 58 may be located between the protrusion portions 57. In this way, the absorbing material 58 is provided at a position at which the leaking waste liquid is easily absorbed.

Configuration of Waste Liquid Flow Path 60

The liquid discharge apparatus 11 includes the waste liquid flow path 60. The waste liquid flow path 60 is not assembled on the reception portion 50 and does not have to operate in conjunction with the reception portion 50. When the maintenance portion 22 is arranged at the execution position P22, the waste liquid flow path 60 may be located downstream of the communication path 54. The waste liquid can flow through the waste liquid flow path 60. Specifically, the liquid discharge apparatus 11 includes the first waste liquid flow path 61 and the second waste liquid flow path 62 as the waste liquid flow path 60.

When the maintenance portion 22 is arranged at the execution position P22, the first waste liquid flow path 61 is provided downstream of the first communication path 55. The first waste liquid flow path 61 is provided on the side of the first width direction X1 with respect to the center of the cap portion 40. In other words, the first waste liquid flow path 61 is provided on one side with respect to the center of the cap portion 40 in the width direction X.

When the maintenance portion 22 is arranged at the execution position P22, the second waste liquid flow path 62 is provided downstream of the second communication path 56. The first waste liquid flow path 61 is provided on the side of the second width direction X2 with respect to the center of the cap portion 40. The second waste liquid flow path 62 is provided on the other side with respect to the center of the cap portion 40 in the width direction X.

Configuration of Accommodation Portion 63

The liquid discharge apparatus 11 includes an accommodation portion 63. The accommodation portion 63 is not assembled on the waste liquid flow path 60 and does not have to operate in conjunction with the reception portion 50. The accommodation portion 63 is located downstream of the waste liquid flow path 60. The accommodation portion 63 is located on the lower side Z2 of the other end portion 60B of the waste liquid flow path 60. Specifically, the accommodation portion 63 is located downstream of the first waste liquid flow path 61. The accommodation portion 63 is located on the lower side Z2 of the other end portion 61B of the first waste liquid flow path 61. The accommodation portion 63 is located downstream of the second waste liquid flow path 62. The accommodation portion 63 is located on the lower side Z2 of the other end portion 62B of the second waste liquid flow path 62. The accommodation portion 63 is configured to accommodate the waste liquid from the waste liquid flow path 60. The accommodation portion 63 may accommodate the absorbing material.

The liquid discharge apparatus 11 includes a liquid detection portion 64. The liquid detection portion 64 is provided in the accommodation portion 63. The liquid detection portion 64 can detect the waste liquid. The liquid detection portion 64 outputs a signal indicating that the waste liquid is detected to the control portion 25.

As a result, when the signal indicating that the waste liquid is detected is input from the liquid detection portion 64, the control portion 25 can give notification that the waste liquid accommodated in the accommodation portion 63 is detected. The control portion 25 may cause a notification portion of the liquid discharge apparatus 11 to give notification that the waste liquid accommodated in the accommodation portion 63 is detected. The control portion 25 may cause a notification portion of a terminal apparatus, which is not illustrated, communicably connected to the liquid discharge apparatus 11 to give notification that the waste liquid accommodated in the accommodation portion 63 is detected.

Configuration of Communication Path 54

Next, a configuration of the communication path 54 will be described with reference to FIGS. 8 to 11.

As illustrated in FIGS. 8 to 11, the communication path 54 may include a start end portion 54A, a through-hole 54B, and a termination end portion 54C. The start end portion 54A is provided on the first reception surface 52. In other words, the start end portion 54A is provided on the reception surface 51. The start end portion 54A may be a start end of an upstream flow path communicating with an upstream part of the through-hole 54B. The upstream flow path is provided along the width direction X. The through-hole 54B is a hole that allows the reception surface 51 and a back surface 51A of the reception surface 51 to communicate with each other. In other words, the through-hole 54B penetrates the reception portion 50. The through-hole 54B is provided in the second reception surface 53, but may be provided in the first reception surface 52. The termination end portion 54C is provided on the back surface 51A of the reception surface 51. The termination end portion 54C may be the termination end of the downstream flow path communicating with a downstream part of the through-hole 54B.

Figure 9:
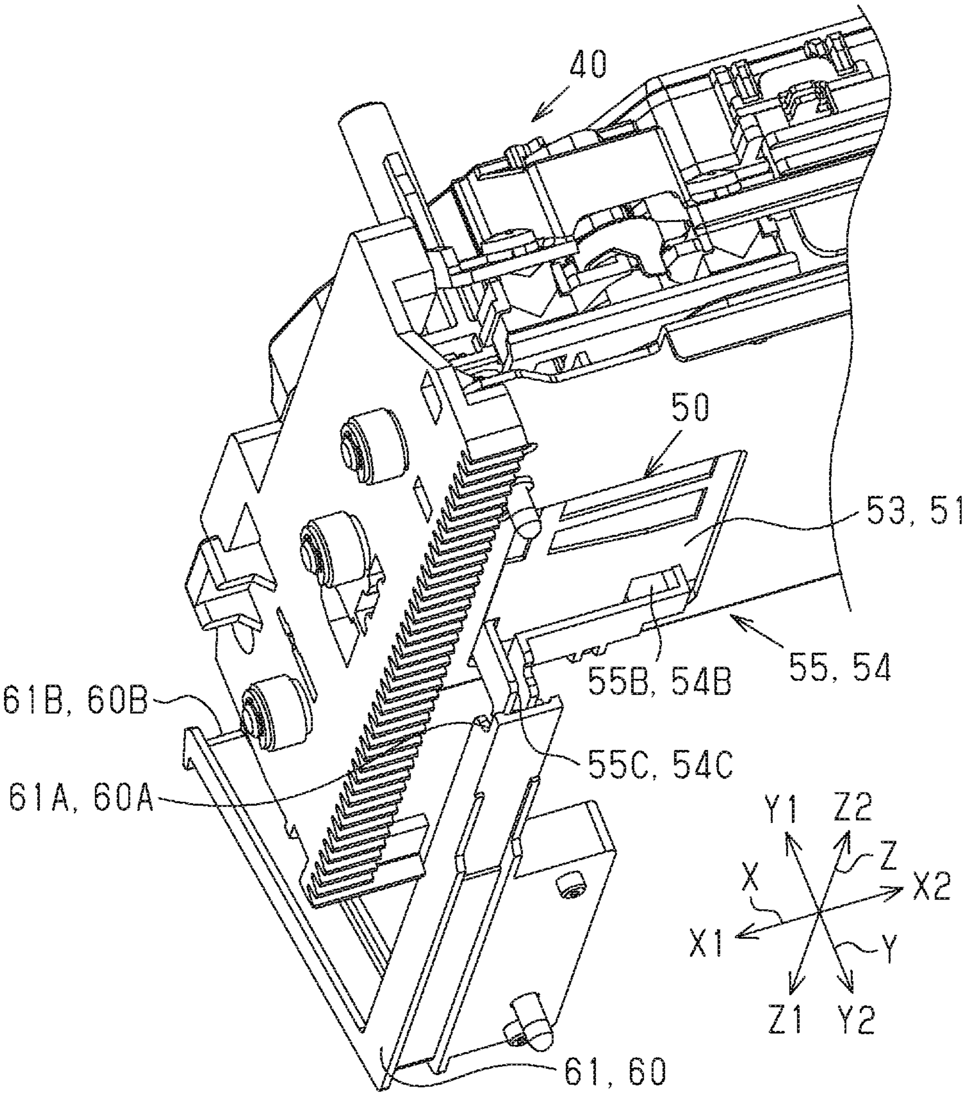
FIG. 9 is a perspective view illustrating the first communication path.
Figure 11:
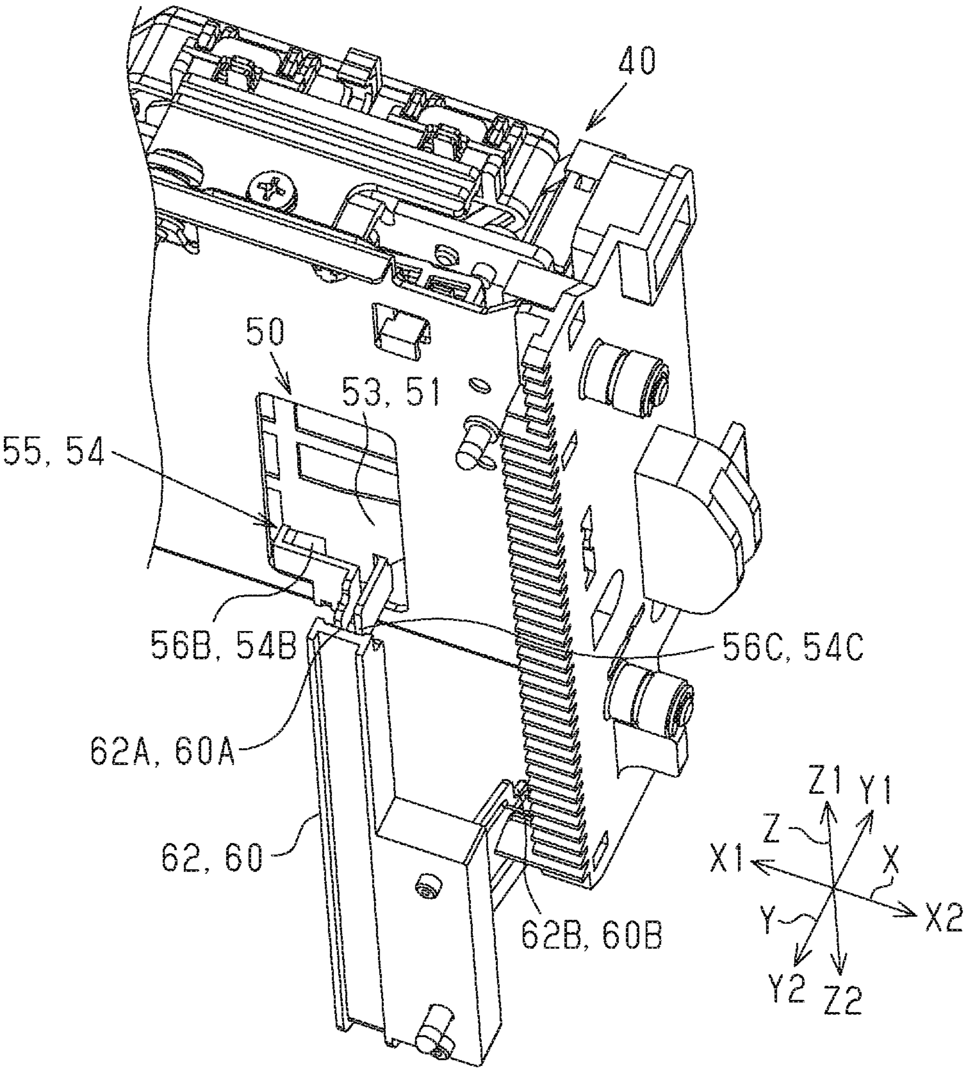
FIG. 11 is a perspective view illustrating the second communication path.

As illustrated in FIGS. 9 and 11, the waste liquid flow path 60 is provided on the lower side Z2 of the termination end portion 54C of the communication path 54. The waste liquid flow path 60 has one end portion 60A and the other end portion 60B. The one end portion 60A is an end portion located on an upper portion of the waste liquid flow path 60. The one end portion 60A of the waste liquid flow path 60 is located on the lower side Z2 of the termination end portion 54C of the communication path 54. The other end portion 60B is an end portion located on the lower portion of the waste liquid flow path 60. The one end portion 60A of the waste liquid flow path 60 can receive the waste liquid guided by the communication path 54.

Figure 8:
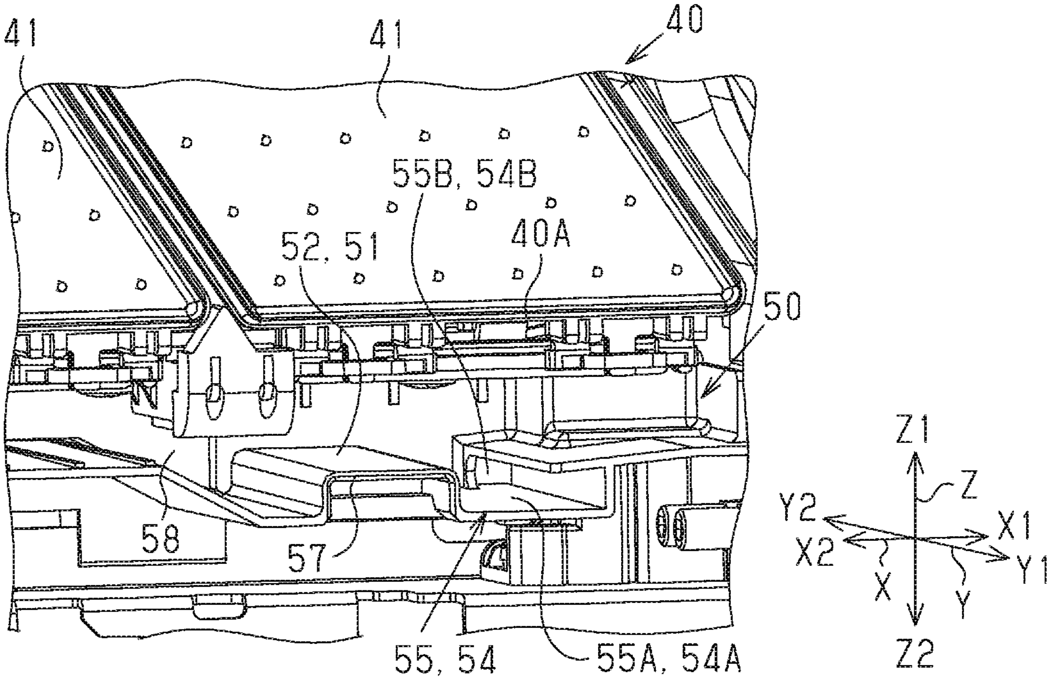
FIG. 8 is a perspective view illustrating a first communication path.

Specifically, as illustrated in FIGS. 8 and 9, the first communication path 55 may include a first start end portion 55A, a first through-hole 55B, and a first termination end portion 55C. The first start end portion 55A is provided on the first reception surface 52. In other words, the first start end portion 55A is provided on the reception surface 51. The first start end portion 55A may be a start end of an upstream flow path communicating with an upstream part of the first through-hole 55B. The first through-hole 55B is a hole penetrating the reception surface 51 and the back surface 51A of the reception surface 51. In other words, the first through-hole 55B penetrates the reception portion 50. The first through-hole 55B is provided in the second reception surface 53, but may be provided in the first reception surface 52. The first termination end portion 55C is provided on the back surface 51A of the reception surface 51. The first termination end portion 55C may be a termination end of a downstream flow path communicating with a downstream part of the first through-hole 55B.

As illustrated in FIG. 9, the first waste liquid flow path 61 is provided on the lower side Z2 of the first termination end portion 55C. The first waste liquid flow path 61 has one end portion 61A and the other end portion 61B. The one end portion 61A of the first waste liquid flow path 61 is located on the lower side Z2 of the first termination end portion 55C. The one end portion 61A of the first waste liquid flow path 61 can receive the waste liquid guided by the first communication path 55.

Figure 10:
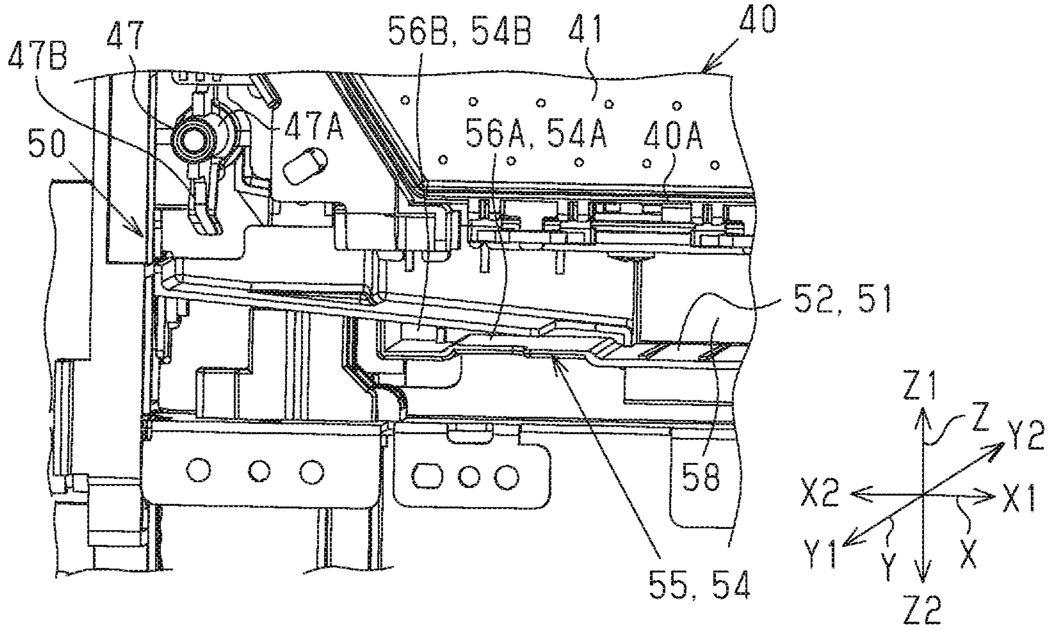
FIG. 10 is a perspective view illustrating a second communication path.

As illustrated in FIGS. 10 and 11, the second communication path 56 may include a second start end portion 56A, a second through-hole 56B, and a second termination end portion 56C. The second start end portion 56A is provided on the reception surface 51. The second start end portion 56A may be a start end of an upstream flow path communicating with an upstream part of the second through-hole 56B. The second through-hole 56B is a hole penetrating the reception surface 51 and the back surface 51A of the reception surface 51. In other words, the second through-hole 56B penetrates the reception portion 50. The second through-hole 56B is provided in the second reception surface 53, but may be provided in the first reception surface 52. The second termination end portion 56C is provided on the back surface 51A of the reception surface 51. The second termination end portion 56C may be a termination end of a downstream flow path communicating with a downstream part of the second through-hole 56B.

As illustrated in FIG. 11, the second waste liquid flow path 62 is provided on the lower side Z2 of the second termination end portion 56C. The second waste liquid flow path 62 has one end portion 62A and the other end portion 62B. The one end portion 62A of the second waste liquid flow path 62 is located on the lower side Z2 of the second termination end portion 56C. The one end portion 62A of the second waste liquid flow path 62 can receive the waste liquid guided by the second communication path 56.

Configuration of Second Positioning Portion 47

In addition, as illustrated in FIG. 10, the second positioning portion 47 may include a guide portion 47A. The guide portion 47A extends in the direction D2 opposite to the discharge direction D1. The guide portion 47A guides the movement of the liquid discharge portion 21 in the first movement direction D. The guide portion 47A may perform the positioning of the liquid discharge portion 21 and the maintenance portion 22 in the second movement direction C. The guide portion 47A may perform the positioning of the liquid discharge portion 21 and the maintenance portion 22 in the first movement direction D.

The second positioning portion 47 may include an extension portion 47B. The extension portion 47B extends in the direction D2 opposite to the discharge direction D1. The extension portion 47B extends from the guide portion 47A toward the direction C2 opposite to the transport direction C1. In this way, the extension portion 47B extends toward the first reception surface 52. In other words, the extension portion 47B extends toward the reception portion 50. It is preferable that the second positioning portion 47 is located on the lower side Z2 than the first positioning portion 46 and includes the extension portion 47B.

Actions of First Embodiment

The actions of the first embodiment will be described.

When the liquid discharge portion 21 is located at the maintenance position P12 and the maintenance portion 22 is located at the execution position P22, the nozzle surface 32 is covered by the cap portion 40. When the liquid discharge portion 21 moves from the maintenance position P12 to the retracted position P13, the nozzle surface 32 is separated from the cap portion 40.

Under such circumstances, the liquid as the waste liquid may drip from the cap portion 40 that covers the nozzle surface 32. In particular, as the nozzle surface 32 is separated from the cap portion 40, the liquid as the waste liquid may drip from the cap portion 40 that covers the nozzle surface 32.

The waste liquid from the cap portion 40 is received by the reception portion 50 after passing, for example, the side surface 40A of the cap portion 40 and the bottom surface 40B of the cap portion 40 and dripping to the lower side Z2. Specifically, the waste liquid from the cap portion 40 is received by at least any one of the first reception surface 52 and the second reception surface 53. In addition, the waste liquid received by the second reception surface 53 passes the second reception surface 53 and is guided to the first reception surface 52 located on the lower side Z2.

The waste liquid received by the first reception surface 52 is guided toward the center in the width direction X along the inclination at both end portions in the width direction X. Then, the waste liquid from both end portions in the width direction X toward the center is guided to the first communication path 55 or the second communication path 56.

The waste liquid received by the first reception surface 52 may be absorbed by the absorbing material 58 at the center in the width direction X. Further, the waste liquid that is not absorbed by the absorbing material 58 is stored between the protrusion portions 57 when the waste liquid has a predetermined amount. As a result, the spreading of the waste liquid received by the first reception surface 52 can be suppressed. When the amount of the waste liquid not absorbed by the absorbing material 58 exceeds the predetermined amount, the waste liquid is guided to the first communication path 55 or the second communication path 56 beyond the protrusion portion 57.

The waste liquid guided to the first communication path 55 is guided to the first termination end portion 55C from the first start end portion 55A through the first through-hole 55B. Similarly, the waste liquid guided to the second communication path 56 is guided to the second termination end portion 56C from the second start end portion 56A through the second through-hole 56B. As a result, the waste liquid received by the reception surface 51 is guided to the back surface 51A of the reception surface 51.

Then, the waste liquid guided to the first termination end portion 55C is guided to the accommodation portion 63 through the first waste liquid flow path 61. Similarly, the waste liquid guided to the second termination end portion 56C is guided to the accommodation portion 63 through the second waste liquid flow path 62. When the waste liquid is accommodated in the accommodation portion 63, the waste liquid accommodated in the accommodation portion 63 is detected by the liquid detection portion 64. As a result, it is possible to give notification that the waste liquid accommodated in the accommodation portion 63 is detected.

Effects of First Embodiment

The effects of the first embodiment will be described.

1-1. The reception portion 50 includes the communication path 54 that guides the received waste liquid to the waste liquid flow path 60. The communication path 54 is provided at a lower portion of the reception portion 50. Therefore, even when the waste liquid drips from the cap portion 40, the waste liquid dripping from the cap portion 40 can be received by the reception portion 50. Then, the waste liquid can be guided from the reception portion 50 to the waste liquid flow path 60 through the communication path 54. Therefore, the leakage of the waste liquid to the outside of the liquid discharge apparatus 11 can be suppressed.

1-2. The communication path 54 includes the start end portion 54A, the through-hole 54B, and the termination end portion 54C. The start end portion 54A is provided on the reception surface 51. The through-hole 54B penetrates the reception portion 50. The termination end portion 54C is provided on the back surface 51A of the reception surface 51. The one end portion 60A of the waste liquid flow path 60 is located on the lower side Z2 of the termination end portion 54C and can receive the waste liquid guided by the communication path 54. Therefore, the communication path 54 can guide the waste liquid received by the reception surface 51 from the reception surface 51 to the back surface 51A of the reception surface 51 through the through-hole 54B. In this way, it is possible to allow a degree of freedom in the position at which the communication path 54 is provided. In addition, even with such a configuration, the leakage of the waste liquid to the outside of the liquid discharge apparatus 11 can be suppressed.

1-3. The liquid discharge apparatus 11 includes the accommodation portion 63 located on the lower side Z2 of the other end portion 60B of the waste liquid flow path 60. The accommodation portion 63 can accommodate the waste liquid flowing through the waste liquid flow path 60. Therefore, even when the waste liquid drips from the maintenance portion 22, the waste liquid guided from the reception portion 50 to the waste liquid flow path 60 through the communication path 54 can be accommodated in the accommodation portion 63. Therefore, the leakage of the waste liquid to the outside of the liquid discharge apparatus 11 can be suppressed.

1-4. The reception portion 50 includes the first communication path 55 that guides the received waste liquid to the first waste liquid flow path 61 and the second communication path 56 that guides the received waste liquid to the second waste liquid flow path 62. The first waste liquid flow path 61 and the first communication path 55 are provided on the side of the first width direction X1 with respect to the center of the cap portion 40 in the width direction X. The second waste liquid flow path 62 and the second communication path 56 are provided on the side of the second width direction X2 with respect to the center of the cap portion 40 in the width direction X. Therefore, even when the liquid discharge apparatus 11 itself is inclined in the width direction X, the waste liquid can be guided to the waste liquid flow path 60 from the reception portion 50 through any one of the first communication path 55 or the second communication path 56. Therefore, the leakage of the waste liquid to the outside of the liquid discharge apparatus 11 can be suppressed.

1-5. The one end portion 61A of the first waste liquid flow path 61 is located on the lower side Z2 of the first termination end portion 55C and can receive the waste liquid guided by the first communication path 55. The one end portion 62A of the second waste liquid flow path 62 is located on the lower side Z2 of the second termination end portion 56C and can receive the waste liquid guided by the second communication path 56. The first communication path 55 can guide the waste liquid received by the reception surface 51 from the reception surface 51 to the back surface 51A of the reception surface 51 through the first through-hole 55B. The second communication path 56 can guide the waste liquid received by the reception surface 51 from the reception surface 51 to the back surface 51A of the reception surface 51 through the second through-hole 56B. In this way, it is possible to allow a degree of freedom in the positions in which the first communication path 55 and the second communication path 56 are provided. In addition, even with such a configuration, the leakage of the waste liquid to the outside of the liquid discharge apparatus 11 can be suppressed.

1-6. The reception portion 50 includes the protrusion portion 57 that protrudes to the upper side Z1 between the first communication path 55 and the second communication path 56 in the width direction X. Therefore, by providing the protrusion portion 57 on the reception portion 50, unnecessary spreading of the waste liquid received in the reception portion 50 in the reception portion 50 can be suppressed. Therefore, the leakage of the waste liquid to the outside of the liquid discharge apparatus 11 can be suppressed.

1-7. The reception portion 50 includes the absorbing material 58 that absorbs the liquid between the first communication path 55 and the second communication path 56 in the width direction X. Therefore, by providing the absorbing material 58 on the reception portion 50, unnecessary spreading of the waste liquid received in the reception portion 50 in the reception portion 50 can be suppressed. Therefore, the leakage of the waste liquid to the outside of the liquid discharge apparatus 11 can be suppressed.

1-8. The reception portion 50 includes the first reception surface 52 facing the side surface 40A among the side surfaces of the cap portion 40 facing the lower side Z2 and the second reception surface 53 facing the bottom surface 40B of the cap portion 40. Therefore, even when the waste liquid drips from the cap portion 40, the waste liquid dripping from the cap portion 40 can be received by both the first reception surface 52 and the second reception surface 53. Then, the waste liquid can be guided from the reception portion 50 to the waste liquid flow path 60 through the communication path 54. Therefore, the leakage of the waste liquid to the outside of the liquid discharge apparatus 11 can be suppressed.

1-9. The liquid discharge apparatus 11 includes the liquid detection portion 64 that can detect the waste liquid. The liquid detection portion 64 is provided in the accommodation portion 63. Therefore, it is possible to detect that the waste liquid is accommodated in the accommodation portion 63. As a result, it is possible to take measures, such as discarding the waste liquid, before the waste liquid leaks to the outside of the liquid discharge apparatus 11. Therefore, the leakage of the waste liquid to the outside of the liquid discharge apparatus 11 can be suppressed.

1-10. The cap portion 40 includes the second positioning portion 47. The second positioning portion 47 regulates the relative movement between the cap portion 40 and the liquid discharge portion 21 when the cap portion 40 and the liquid discharge portion 21 come into contact with each other. The second positioning portion 47 includes the extension portion 47B extending toward the reception portion 50. Therefore, even when the waste liquid drips from the maintenance portion 22, the waste liquid dripping from the maintenance portion 22 can be guided to the reception portion 50 through the second positioning portion 47. As a result, the waste liquid can be guided from the reception portion 50 to the waste liquid flow path 60 through the communication path 54. Therefore, the leakage of the waste liquid to the outside of the liquid discharge apparatus 11 can be suppressed.

Second Embodiment

Hereinafter, a second embodiment will be described. In the second embodiment, the maintenance portion 22 may include a wiping portion. In the following description, the same components as in the embodiment described above are denoted by the same reference numerals, and the repetitive description thereof will be omitted or simplified.

Configuration of Maintenance Portion 22

Figure 12:
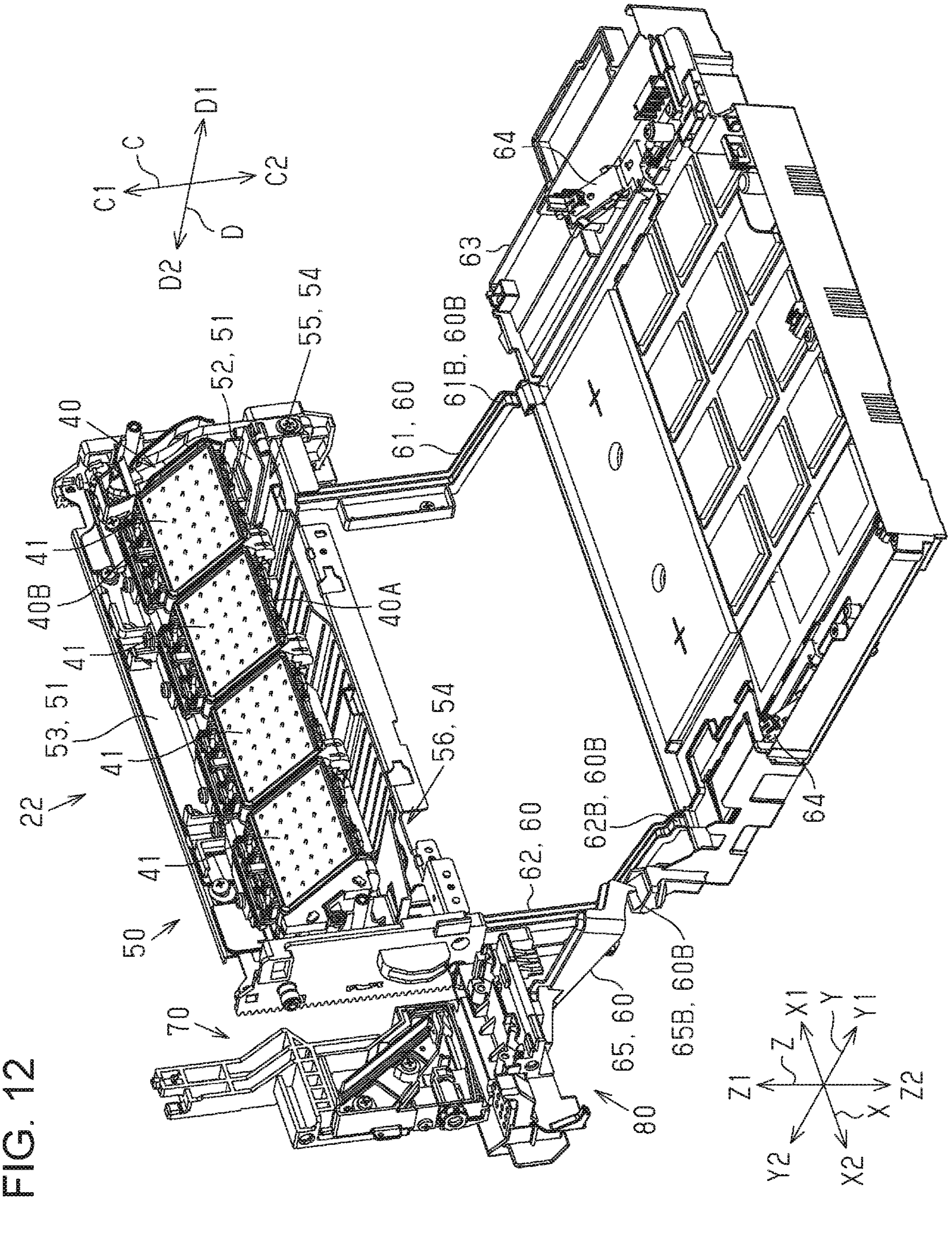
FIG. 12 is a perspective view illustrating a wiping portion, the reception portion, the waste liquid flow path, and the accommodation portion.

As illustrated in FIG. 12, the maintenance portion 22 includes a wiping portion 70. The wiping portion 70 may be arranged to face the liquid discharge portion 21. The wiping portion 70 may be configured to reciprocate along the width direction X. The wiping portion 70 can wipe the nozzle surface 32. In other words, the wiping portion 70 may perform the maintenance on the liquid discharge portion 21 by wiping the nozzle surface 32.

Configuration of Wiping Portion 70

Figure 13:
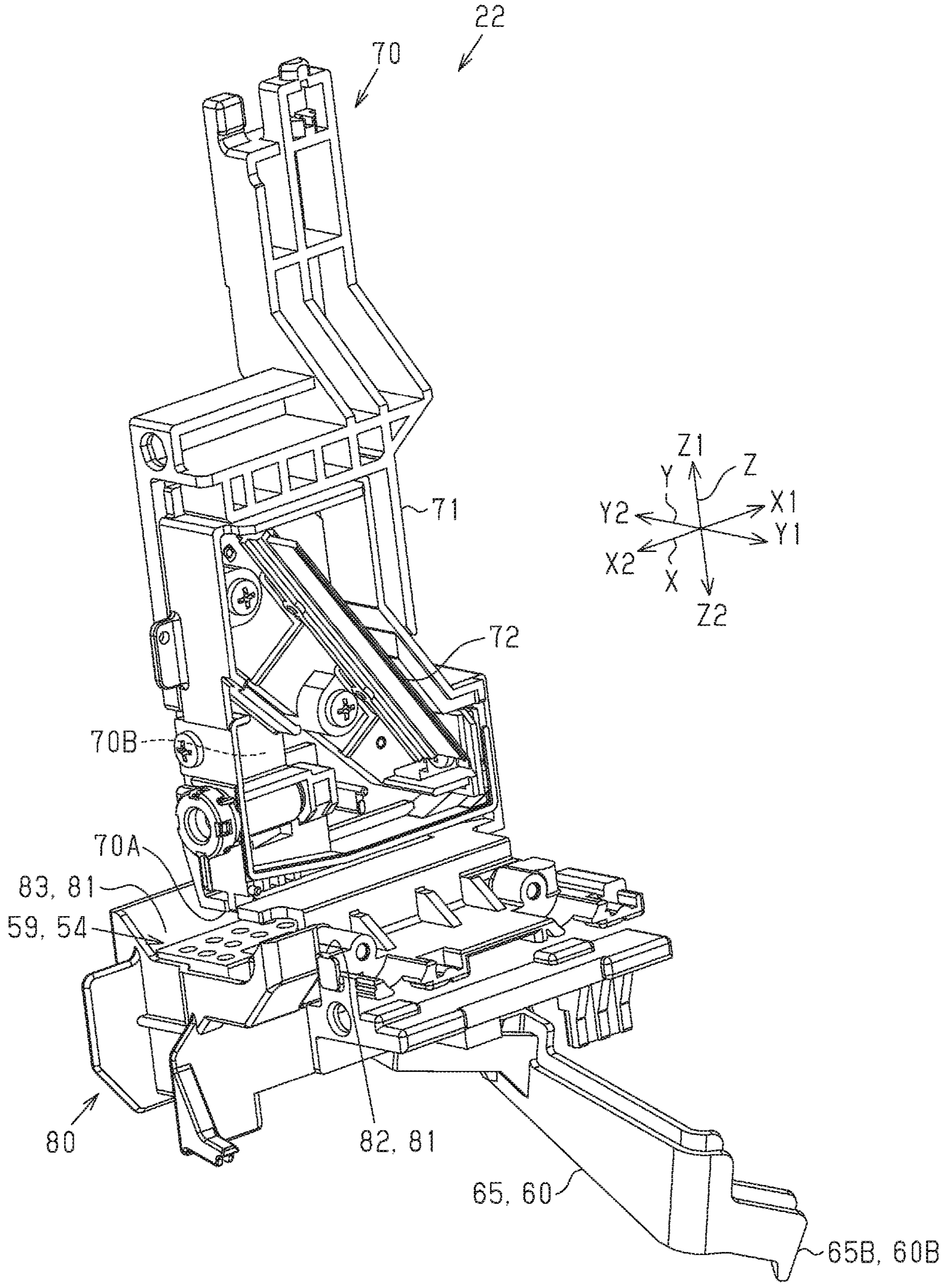
FIG. 13 is a perspective view illustrating the wiping portion.

As illustrated in FIG. 13, the wiping portion 70 includes a wiping carriage 71 and a wiping member 72. The wiping carriage 71 accommodates the wiping member 72. The wiping carriage 71 can reciprocate along the width direction X.

The wiping member 72 is configured to protrude in the first depth direction Y1. The wiping member 72 is provided to be inclined with respect to the vertical direction Z. The wiping member 72 may be arranged to face the liquid discharge portion 21. The wiping member 72 can reciprocate along the width direction X as the wiping carriage 71 moves. The wiping member 72 can wipe the nozzle surface 32. The wiping member 72 may be a wiper.

Configuration of Reception Portion 80

The liquid discharge apparatus 11 includes a reception portion 80. The reception portion 80 can receive the waste liquid dripping from the wiping portion 70. In other words, the reception portion 80 can receive the waste liquid dripping from the maintenance portion 22. The reception portion 80 may be assembled on the wiping portion 70. In other words, the reception portion 80 may be assembled on the maintenance portion 22. The reception portion 80 may operate in conjunction with the wiping portion 70.

In particular, the reception portion 80 may be formed in an L shape when viewed from the side of the second width direction X2. The reception portion 80 is arranged on the lower side Z2 of the wiping portion 70 and in the second depth direction Y2 of the wiping portion 70. In other words, the reception portion 80 is arranged on the lower side Z2 of the maintenance portion 22 and in the second depth direction Y2 of the maintenance portion 22.

The reception portion 80 includes a reception surface 81. The reception surface 81 is a surface that can receive the waste liquid. Specifically, the reception portion 80 may include a third reception surface 82 and a fourth reception surface 83 as the reception surface 81. The third reception surface 82 is a surface facing a bottom surface 70A of the wiping portion 70. The bottom surface 70A of the wiping portion 70 is a surface facing the lower side Z2 of the wiping portion 70. The fourth reception surface 83 is a surface facing a rear surface 70B of the wiping portion 70. The rear surface 70B of the wiping portion 70 is a surface facing in a direction opposite to the direction in which the wiping member 72 protrudes. The third reception surface 82 corresponds to an example of a first reception surface, and the fourth reception surface 83 corresponds to an example of a second reception surface.

Figure 14:
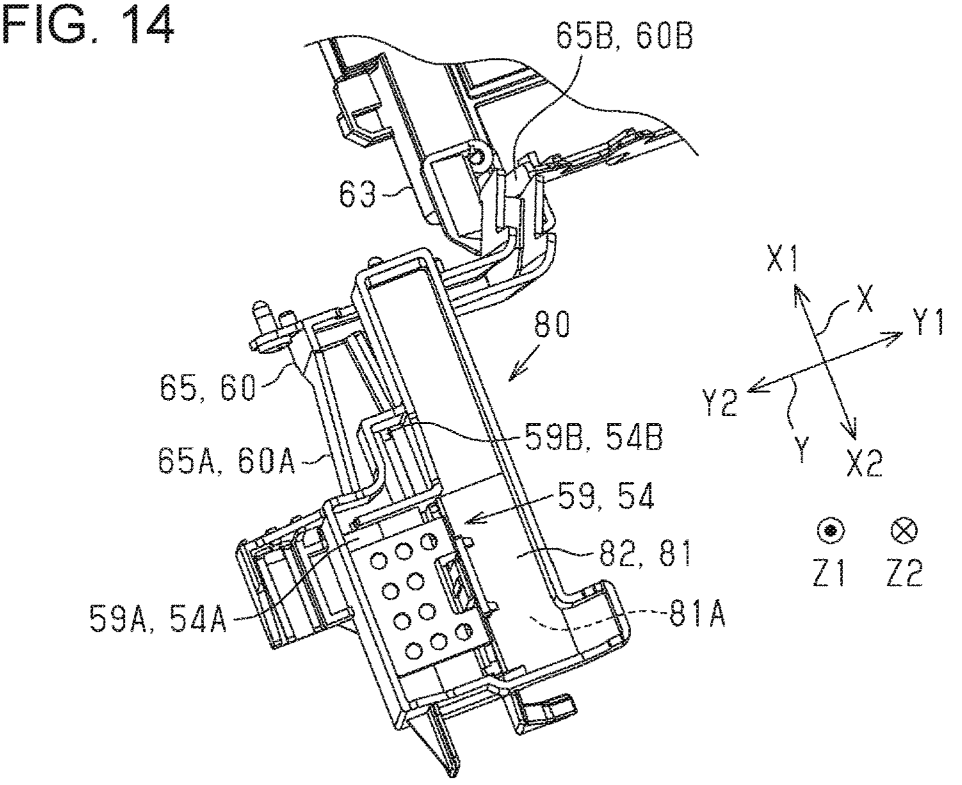
FIG. 14 is a perspective view illustrating a third communication path.
Figure 15:
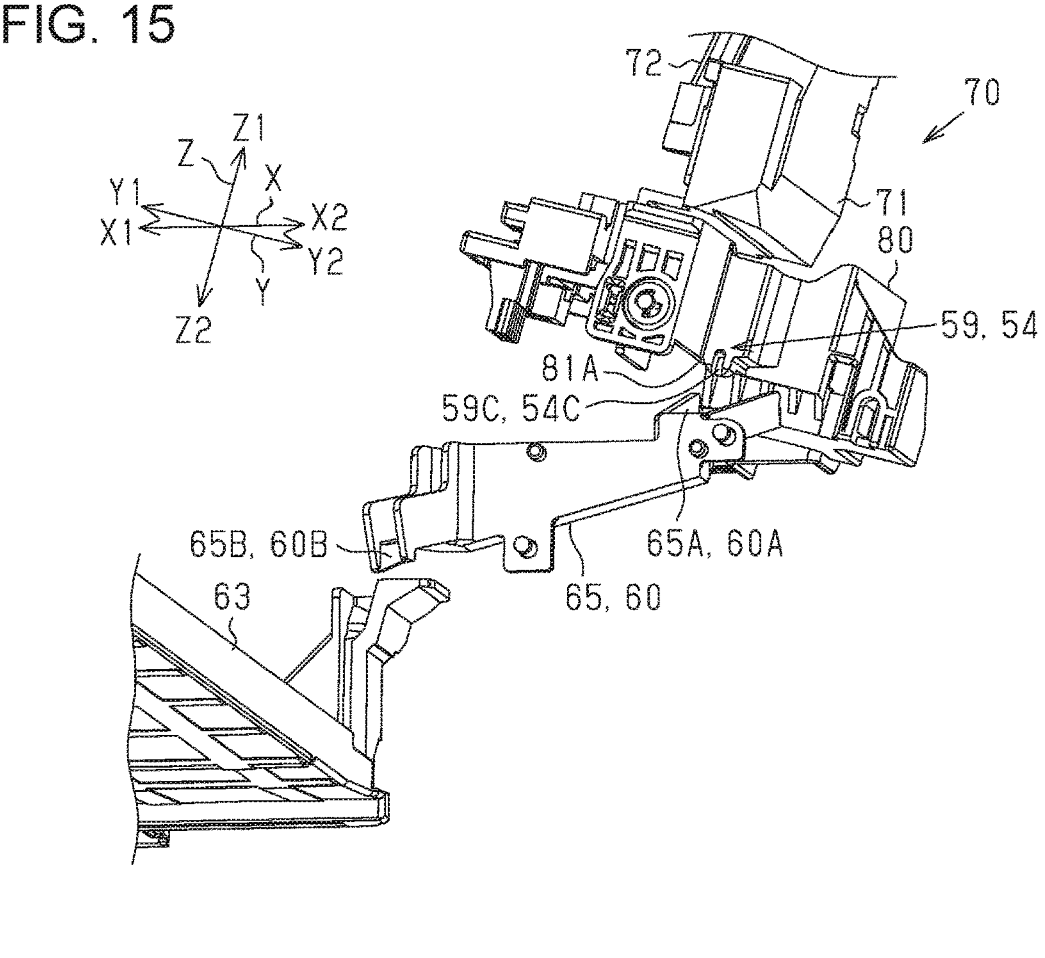
FIG. 15 is a perspective view illustrating the third communication path and a third waste liquid flow path.

As illustrated in FIGS. 13 to 15, the reception portion 80 includes a third communication path 59 as the communication path 54. The third communication path 59 is provided at a lower portion the reception portion 80. The third communication path 59 guides the received waste liquid to a third waste liquid flow path 65 described below.

The third communication path 59 may include a third start end portion 59A, a third through-hole 59B, and a third termination end portion 59C. The third start end portion 59A is provided on the third reception surface 82. In other words, the third start end portion 59A is provided on the reception surface 81. The third start end portion 59A may be a start end of the upstream flow path communicating with an upstream part of the third through-hole 59B. The third through-hole 59B is a hole penetrating the reception surface 81 and a back surface 81A of the reception surface 81. In other words, the third through-hole 59B penetrates the reception portion 80. The third through-hole 59B is provided in the third reception surface 82, but may be provided in the fourth reception surface 83. The third termination end portion 59C is provided on the back surface 81A of the reception surface 81. The third termination end portion 59C may be a termination end of the downstream flow path communicating with a downstream part of the third through-hole 59B.

Configuration of Third Waste Liquid Flow Path 65

The liquid discharge apparatus 11 includes the third waste liquid flow path 65 as the waste liquid flow path 60. The third waste liquid flow path 65 is provided downstream of the third communication path 59. The third waste liquid flow path 65 is provided on the lower side Z2 of the third termination end portion 59C.

The third waste liquid flow path 65 has one end portion 65A and the other end portion 65B. The one end portion 65A of the third waste liquid flow path 65 is located on the lower side Z2 of the third termination end portion 59C. The one end portion 65A of the third waste liquid flow path 65 can receive the waste liquid guided by the third communication path 59. The accommodation portion 63 is located downstream of the third waste liquid flow path 65. The accommodation portion 63 is located on the lower side Z2 of the other end portion 65B of the third waste liquid flow path 65.

Actions of Second Embodiment

The actions of the second embodiment will be described.

The waste liquid wiped from the nozzle surface 32 by the wiping portion 70 drips from the wiping member 72. The waste liquid dripping from the wiping portion 70 is received by the reception portion 80. Specifically, the waste liquid from the wiping portion 70 is received by at least any one of the third reception surface 82 and the fourth reception surface 83. In addition, the waste liquid received by the fourth reception surface 83 passes the fourth reception surface 83 and is guided to the third reception surface 82 located on the lower side Z2. The waste liquid received by the third reception surface 82 is guided to the third communication path 59.

The waste liquid guided to the third communication path 59 is guided from the third start end portion 59A to the third termination end portion 59C through the third through-hole 59B. As a result, the waste liquid received by the reception surface 81 is guided to the back surface 81A of the reception surface 81. Then, the waste liquid guided to the third termination end portion 59C is guided to the accommodation portion 63 through the third waste liquid flow path 65.

Effects of Second Embodiment

The effects of the second embodiment will be described.

2-1. The reception portion 80 includes the third communication path 59 that guides the received waste liquid to the third waste liquid flow path 65. The third communication path 59 is provided at a lower portion the reception portion 80. Therefore, even when the waste liquid drips from the wiping portion 70, the waste liquid dripping from the wiping portion 70 can be received by the reception portion 80. Then, the waste liquid can be guided from the reception portion 80 to the third waste liquid flow path 65 through the third communication path 59. Therefore, the leakage of the waste liquid to the outside of the liquid discharge apparatus 11 can be suppressed.

Modification Examples

The present embodiment can be modified and carried out as follows. The present embodiment and the modification examples described below can be carried out in combination with each other within a technically consistent range.

When the liquid discharge portion 21 is configured to move in the width direction X, the wiping portion 70 does not have to move in the width direction X. The reception portion 80 does not have to operate in conjunction with the wiping portion 70. In such a case, the reception portion 80 may be assembled on the wiping portion 70 or does not have to be assembled on the wiping portion 70 as long as the waste liquid from the wiping portion 70 can be received.

The reception portion 50 is not assembled on the maintenance portion 22 and does not have to operate in conjunction with the maintenance portion 22. The waste liquid flow path 60 may operate in conjunction with the reception portion 50. The accommodation portion 63 may operate in conjunction with the reception portion 50.

The reception portion 50 may be configured to allow the communication path 54 and the waste liquid flow path 60 communicate with each other when the maintenance portion 22 is arranged at the standby position P21.

The reception surface 51 need only include at least any one of the first reception surface 52 and the second reception surface 53. The reception surface 51 may include another reception surface other than the first reception surface 52 and the second reception surface 53.

The waste liquid flow path 60 may or does not have to be physically coupled to the termination end portion 54C of the communication path 54. The reception portion 50 and the waste liquid flow path 60 may be integrally formed.

The accommodation portion 63 may or does not have to be physically coupled to the other end portion 60B of the waste liquid flow path 60. The waste liquid flow path 60 and the accommodation portion 63 may be integrally formed.

The communication path 54 does not have to include the upstream flow path of the through-hole 54B. In other words, the start end portion 54A may be an opening portion upstream of the through-hole 54B, and can be said to be an upstream end portion of the through-hole 54B. The communication path 54 does not have to include the downstream flow path of the through-hole 54B. In other words, the termination end portion 54C may be an opening portion downstream of the through-hole 54B or may be a downstream end portion of the through-hole 54B. Also, the communication path 54 does not have to include both the upstream flow path of the through-hole 54B and the downstream flow path of the through-hole 54B.

The through-hole 54B is the hole penetrating the second reception surface 53 in the depth direction Y, but the present disclosure is not limited to this, and the through-hole 54B need only be any hole penetrating the reception portion 50. For example, the through-hole 54B may be a hole penetrating the first reception surface 52 in the width direction X. For example, the through-hole 54B may be a hole penetrating the first reception surface 52 in the vertical direction Z.

The second positioning portion 47 may regulate relative movement between the cap portion 40 and the liquid discharge portion 21 in the width direction X when the cap portion 40 and the liquid discharge portion 21 come into contact with each other as the liquid discharge portion 21 moves to the cap portion 40. In other words, the second positioning portion 47 may regulate the relative movement between the cap portion 40 and the liquid discharge portion 21 in at least any one of the first movement direction D and the direction intersecting with the first movement direction D.

It is preferable that the extension portion 47B extends in a direction including the component of the lower side Z2 from the guide portion 47A, but the extension portion 47B may extend in a direction not including the component on the lower side Z2 as long as a capillary force is generated. In other words, the extension portion 47B does not have to extend toward the reception portion 50.

The extension portion 47B may regulate the relative movement between the cap portion 40 and the liquid discharge portion 21 in at least any one of the first movement direction D and the direction intersecting with the first movement direction D. In this case, the second positioning portion 47 does not have to include the guide portion 47A. The first positioning portion 46 may have the same configuration as the extension portion 47B. The second positioning portion 47 does not have to include the extension portion 47B.

An angle formed by the first movement direction D and the horizontal direction may be larger than 0 degrees and equal to or less than 30 degrees. As a result, the size in the horizontal direction can be reduced. The angle formed by the first movement direction D and the horizontal direction may be 0 degrees, or may be larger than 30 degrees.

The movement portion 24 may be configured to move the maintenance portion 22 toward the liquid discharge portion 21 out of the liquid discharge portion 21 and the maintenance portion 22. In other words, the movement portion 24 need only be configured to move one of the liquid discharge portion 21 and the maintenance portion 22 toward the other of the liquid discharge portion 21 and the maintenance portion 22.

At least any one of the first positioning portion 46 and the second positioning portion 47 may be provided in the second region R2. A positioning portion other than the first positioning portion 46 and the second positioning portion 47 may be provided in the second region R2.

The entire first positioning portion 46 may be located in the first region R1. In other words, at least a part of the first positioning portion 46 may be provided in the region overlapping the first acute angle portion 41C in the second movement direction C intersecting with the first movement direction D.

The entire second positioning portion 47 may be located in the first region R1. In other words, at least a part of the second positioning portion 47 may be provided in the region overlapping the second acute angle portion 41D in the second movement direction C intersecting with the first movement direction D.

The cap member 41 does not have to have the parallelogram shape when viewed in the first movement direction D. For example, the cap member 41 may have a rectangular shape when viewed in the first movement direction D.

The liquid discharge apparatus 11 may discharge liquid other than the ink to perform recording. A state of the liquid discharged as a minute amount of droplets from the liquid discharge apparatus 11 includes liquid having a granular, lacrimal, or filamentous tail. The liquid here need only be any material that can be discharged from the liquid discharge apparatus 11. For example, the liquid need only be in any state as long as the substance is in a liquid phase, and includes a fluid body, such as a liquid material having high or low viscosity, sol, gel water, other inorganic solvent, organic solvent, solution, liquid resin, liquid metal, or metallic melt. The liquid includes, in addition to the liquid as one state of the substance, a substance in which particles of a functional material composed of a solid material, such as a pigment and metal particles, are dissolved, dispersed, or mixed in a solvent, and the like. Representative examples of the liquid include ink and liquid crystal as described in the embodiment described above. Here, the ink includes general water-based ink and oil-based ink as well as various types of liquid compositions, such as gel ink or hot melt ink. As a specific example of the liquid discharge apparatus 11, for example, there is an apparatus that discharges liquid containing a material, such as an electrode material or a coloring material used for manufacturing a liquid crystal display, an electroluminescence display, a surface emitting display, or a color filter, in a dispersed or dissolved form. The liquid discharge apparatus 11 may be an apparatus that discharges a bioorganic substance used for manufacturing a biochip, an apparatus that discharges liquid as a sample used as a precision pipette, a printing apparatus, a micro dispenser, or the like. The liquid discharge apparatus 11 may be an apparatus that discharges lubricating oil to precision machinery, such as a watch or a camera, with pinpoint accuracy, or an apparatus that discharges transparent resin liquid, such as an ultraviolet curable resin, onto a substrate to form a micro hemispherical lens, an optical lens, and the like used for an optical communication element or the like. The liquid discharge apparatus 11 may be an apparatus that discharge an etching solution, such as an acid or an alkali, to etch a substrate or the like.

The expression "at least any one of" used in the present specification means one or more of desired options. As an example, the expression "at least any one of" used in the present specification means only one option or both of two options when the number of options is two. In another example, the expression "at least any one of"

used in the present specification means only one option or a combination of any two or more options when the number of options is three or more.

Supplementary Notes

Hereinafter, the technical ideas and the actions and effects grasped from the embodiments and the modification examples described above will be described.

A. A liquid discharge apparatus includes a liquid discharge portion configured to discharge liquid, a maintenance portion that performs maintenance of the liquid discharge portion, a reception portion arranged on a lower side of the maintenance portion in a vertical direction and configured to receive waste liquid dripping from the maintenance portion, and a waste liquid flow path through which the waste liquid is flowable, in which the liquid discharge portion includes a nozzle configured to discharge the liquid in a discharge direction intersecting with the vertical direction, the reception portion includes a communication path that guides the received waste liquid to the waste liquid flow path, and the communication path is provided at a lower portion of the reception portion.

With this configuration, even when the waste liquid drips from the maintenance portion, the waste liquid dripping from the maintenance portion can be received by the reception portion. Then, the waste liquid can be guided from the reception portion to the waste liquid flow path through the communication path. Therefore, the leakage of the waste liquid to the outside of the liquid discharge apparatus can be suppressed.

B. In the liquid discharge apparatus described above, the reception portion may have a reception surface and a back surface of the reception surface, the communication path may include a start end portion, a through-hole, and a termination end portion, the start end portion may be provided on the reception surface, the through-hole may penetrate the reception portion, the termination end portion may be provided on the back surface of the reception surface, and one end portion of the waste liquid flow path may be located on a lower side of the termination end portion in the vertical direction and may be configured to receive the waste liquid guided by the communication path.

With this configuration, the communication path can guide the waste liquid received by the reception surface from the reception surface to the back surface of the reception surface through the through-hole. In this way, it is possible to allow a degree of freedom in the position at which the communication path is provided. In addition, even with such a configuration, the leakage of the waste liquid to the outside of the liquid discharge apparatus can be suppressed.

C. The liquid discharge apparatus described above may further include an accommodation portion located on a lower side of another end portion of the waste liquid flow path in the vertical direction, in which the accommodation portion is configured to accommodate the waste liquid flowing through the waste liquid flow path.

With this configuration, even when the waste liquid drips from the maintenance portion, the waste liquid guided from the reception portion to the waste liquid flow path through the communication path can be accommodated in the accommodation portion. Therefore, the leakage of the waste liquid to the outside of the liquid discharge apparatus can be suppressed.

D. The liquid discharge apparatus described above may further include a second waste liquid flow path through which the waste liquid is flowable when the waste liquid flow path is defined as a first waste liquid flow path and the communication path is defined as a first communication path, in which the maintenance portion includes a cap portion, the cap portion includes a cap member configured to form a space in which the nozzle is open, the cap member has an opening portion being open in a direction opposite to the discharge direction and is configured to form the space in which the nozzle is open by the opening portion coming into contact with the liquid discharge portion, the reception portion includes a second communication path that guides the received waste liquid to the second waste liquid flow path, the second communication path is provided at the lower portion of the reception portion, the first waste liquid flow path and the first communication path are provided on one side with respect to a center of the cap portion in a width direction intersecting with the discharge direction, and the second waste liquid flow path and the second communication path are provided on another side with respect to the center of the cap portion in the width direction.

With this configuration, even when the liquid discharge apparatus itself is inclined in the width direction, the waste liquid can be guided to the waste liquid flow path from the reception portion through any one of the first communication path or the second communication path. Therefore, the leakage of the waste liquid to the outside of the liquid discharge apparatus can be suppressed.

E. In the liquid discharge apparatus described above, when the start end portion of the first communication path is defined as a first start end portion, the through-hole of the first communication path is defined as a first through-hole, and the termination end portion of the first communication path is defined as a first termination end portion, the second communication path may include a second start end portion, a second through-hole, and a second termination end portion, the second start end portion may be provided on the reception surface, the second through-hole may penetrate the reception portion, the second termination end portion may be provided on the back surface of the reception surface, and one end portion of the second waste liquid flow path may be located on a lower side of the second termination end portion in the vertical direction and may be configured to receive the waste liquid guided by the second communication path.

With this configuration, each communication path can guide the waste liquid received by the reception surface from the reception surface to the back surface of the reception surface through each through-hole. In this way, it is possible to allow a degree of freedom in the position at which each communication path is provided. In addition, even with such a configuration, the leakage of the waste liquid to the outside of the liquid discharge apparatus can be suppressed.

F. In the liquid discharge apparatus described above, the reception portion may have at least one protrusion portion that protrudes to an upper side in the vertical direction between the first communication path and the second communication path in the width direction.

With this configuration, by providing at least one protrusion portion on the reception portion, unnecessary spreading of the waste liquid received in the reception portion in the reception portion can be suppressed. Therefore, the leakage of the waste liquid to the outside of the liquid discharge apparatus can be suppressed.

G. In the liquid discharge apparatus described above, the reception portion may include at least one absorbing material that absorbs the liquid between the first communication path and the second communication path in the width direction.

With this configuration, by providing at least one absorbing material on the reception portion, unnecessary spreading of the waste liquid received in the reception portion in the reception portion can be suppressed. Therefore, the leakage of the waste liquid to the outside of the liquid discharge apparatus can be suppressed.

H. In the liquid discharge apparatus described above, the reception portion may have a first reception surface facing a side surface, among side surfaces of the cap portion, facing the lower side in the vertical direction and a second reception surface facing a bottom surface of the cap portion, with a direction in which the opening portion is open as a front surface.

With this configuration, even when the waste liquid drips from the cap portion, the waste liquid dripping from the cap portion can be received by both the first reception surface and the second reception surface. Then, the waste liquid can be guided from the reception portion to the waste liquid flow path through the communication path. Therefore, the leakage of the waste liquid to the outside of the liquid discharge apparatus can be suppressed.

I. The liquid discharge apparatus described above may further include a liquid detection portion configured to detect the waste liquid, in which the liquid detection portion is provided in the accommodation portion.

With this configuration, it is possible to detect that the waste liquid is accommodated in the accommodation portion. As a result, it is possible to take measures, such as discarding the waste liquid, before the waste liquid leaks to the outside of the liquid discharge apparatus. Therefore, the leakage of the waste liquid to the outside of the liquid discharge apparatus can be suppressed.

J. In the liquid discharge apparatus described above, the cap portion may include a positioning portion, the positioning portion may regulate relative movement between the cap portion and the liquid discharge portion in at least any one of the discharge direction and a direction intersecting with the discharge direction when the cap portion and the liquid discharge portion come into contact with each other, and the positioning portion may have an extension portion extending toward the reception portion.

With this configuration, even when the waste liquid drips from the maintenance portion, the waste liquid dripping from the maintenance portion can be guided to the reception portion through the positioning portion. As a result, the waste liquid can be guided from the reception portion to the waste liquid flow path through the communication path. Therefore, the leakage of the waste liquid to the outside of the liquid discharge apparatus can be suppressed.

What is claimed is:

1. A liquid discharge apparatus comprising:

a liquid discharge portion configured to discharge liquid;

a maintenance portion that performs maintenance of the liquid discharge portion;

a reception portion arranged on a lower side of the maintenance portion in a vertical direction and configured to receive waste liquid dripping from the maintenance portion; and a waste liquid flow path through which the waste liquid flows, wherein the liquid discharge portion includes a nozzle configured to discharge the liquid in a discharge direction intersecting with the vertical direction, the reception portion includes a communication path that guides the received waste liquid to the waste liquid flow path, the communication path is provided at a lower portion of the reception portion, and one end portion of the waste liquid flow path is located on a lower side of a termination end portion in the vertical direction and is configured to receive the waste liquid guided by the communication path.

2. The liquid discharge apparatus according to claim 1, wherein the reception portion has a reception surface and a back surface of the reception surface, the communication path includes a start end portion, a through-hole, and the termination end portion, the start end portion is provided on the reception surface, the through-hole penetrates the reception portion, and the termination end portion is provided on the back surface of the reception surface.

3. The liquid discharge apparatus according to claim 2, further comprising:

an accommodation portion located on a lower side of another end portion of the waste liquid flow path in the vertical direction, wherein the accommodation portion is configured to accommodate the waste liquid flowing through the waste liquid flow path.

4. The liquid discharge apparatus according to claim 3, further comprising:

a liquid detection portion configured to detect the waste liquid, wherein the liquid detection portion is provided in the accommodation portion.

5. The liquid discharge apparatus according to claim 2, further comprising:

a second waste liquid flow path through which the waste liquid is flowable when the waste liquid flow path is defined as a first waste liquid flow path and the communication path is defined as a first communication path, wherein the maintenance portion includes a cap portion, the cap portion includes a cap member configured to form a space in which the nozzle is open, the cap member has an opening portion being open in a direction opposite to the discharge direction and is configured to form the space in which the nozzle is open by the opening portion coming into contact with the liquid discharge portion, the reception portion includes a second communication path that guides the received waste liquid to the second waste liquid flow path, the second communication path is provided at the lower portion of the reception portion, the first waste liquid flow path and the first communication path are provided on one side with respect to a center of the cap portion in a width direction intersecting with the discharge direction, and the second waste liquid flow path and the second communication path are provided on another side with respect to the center of the cap portion in the width direction.

6. The liquid discharge apparatus according to claim 5, wherein when the start end portion of the first communication path is defined as a first start end portion, the through-hole of the first communication path is defined as a first through-hole, and the termination end portion of the first communication path is defined as a first termination end portion, the second communication path includes a second start end portion, a second through-hole, and a second termination end portion, the second start end portion is provided on the reception surface, the second through-hole penetrates the reception portion, the second termination end portion is provided on the back surface of the reception surface, and one end portion of the second waste liquid flow path is located on a lower side of the second termination end portion in the vertical direction and is configured to receive the waste liquid guided by the second communication path.

7. A liquid discharge apparatus according, comprising:

a liquid discharge portion configured to discharge liquid;

a maintenance portion that performs maintenance of the liquid discharge portion;

a reception portion arranged on a lower side of the maintenance portion in a vertical direction and configured to receive waste liquid dripping from the maintenance portion; and a waste liquid flow path through which the waste liquid flows, wherein the liquid discharge portion includes a nozzle configured to discharge the liquid in a discharge direction intersecting with the vertical direction, the reception portion includes a communication path that guides the received waste liquid to the waste liquid flow path, and the communication path is provided at a lower portion of the reception portion;

a second waste liquid flow path through which the waste liquid flows when the waste liquid flow path is defined as a first waste liquid flow path and the communication path is defined as a first communication path, wherein the maintenance portion includes a cap portion, the cap portion includes a cap member configured to form a space in which the nozzle is open, the cap member has an opening portion being open in a direction opposite to the discharge direction and is configured to form the space in which the nozzle is open by the opening portion coming into contact with the liquid discharge portion, the reception portion includes a second communication path that guides the received waste liquid to the second waste liquid flow path, the second communication path is provided at the lower portion of the reception portion, the first waste liquid flow path and the first communication path are provided on one side with respect to a center of the cap portion in a width direction intersecting with the discharge direction, and the second waste liquid flow path and the second communication path are provided on another side with respect to the center of the cap portion in the width direction.

8. The liquid discharge apparatus according to claim 7, wherein the reception portion has at least one protrusion portion that protrudes to an upper side in the vertical direction between the first communication path and the second communication path in the width direction.

9. The liquid discharge apparatus according to claim 7, wherein the reception portion includes at least one absorbing material that absorbs the liquid between the first communication path and the second communication path in the width direction.

10. The liquid discharge apparatus according to claim 7, wherein the reception portion has a first reception surface facing a side surface, among side surfaces of the cap portion, facing the lower side in the vertical direction and a second reception surface facing a bottom surface of the cap portion, with a direction in which the opening portion is open as a front surface.

11. The liquid discharge apparatus according to claim 7, wherein the cap portion includes a positioning portion, the positioning portion regulates relative movement between the cap portion and the liquid discharge portion in at least any one of the discharge direction and a direction intersecting with the discharge direction when the cap portion and the liquid discharge portion come into contact with each other, and the positioning portion has an extension portion extending toward the reception portion.

* * * * *